United States Patent
Gugumus et al.

(10) Patent No.: US 6,747,077 B2
(45) Date of Patent: Jun. 8, 2004

(54) STABILIZED METALLOCENE POLYPROPYLENE

(75) Inventors: François Gugumus, Allschwil (CH); Nicola Lelli, Basel (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/973,425

(22) Filed: Oct. 9, 2001

(65) Prior Publication Data

US 2002/0077394 A1 Jun. 20, 2002

(30) Foreign Application Priority Data

Oct. 17, 2000  (EP) .............................. 00810957

(51) Int. Cl.$^7$ ................................ C08K 5/34
(52) U.S. Cl. ................. 524/100; 524/99; 524/102; 524/400; 524/432; 524/433
(58) Field of Search .................. 524/99, 100, 102, 524/400, 430, 432, 433

(56) References Cited

U.S. PATENT DOCUMENTS

| | | | |
|---|---|---|---|
| 4,863,981 A | 9/1989 | Gugumus | 524/97 |
| 5,679,733 A | 10/1997 | Malik et al. | 524/99 |
| 5,719,217 A | 2/1998 | Gugumus | 524/100 |
| 5,919,399 A | 7/1999 | Gugumus | 252/403 |
| 5,955,522 A | 9/1999 | Rotzinger et al. | 524/119 |
| 5,980,783 A | 11/1999 | Gugumus | 252/401 |
| 6,013,703 A | 1/2000 | Kuhn et al. | 524/100 |
| 6,020,406 A | 2/2000 | Gugumus | 524/95 |
| 2002/0077393 A1 | 6/2002 | Gugumus | 524/99 |

FOREIGN PATENT DOCUMENTS

| | | |
|---|---|---|
| EP | 0449685 | 10/1991 |
| EP | 0476612 | 3/1992 |
| EP | 0632092 | 1/1995 |
| EP | 0723990 | 7/1996 |
| EP | 0741163 | 11/1996 |
| EP | 0814127 | 12/1997 |
| EP | 0927743 | 7/1999 |
| GB | 2267499 | 12/1993 |
| GB | 2301106 | 11/1996 |
| GB | 2346147 | 8/2000 |
| NL | 1018187 | 12/2001 |

OTHER PUBLICATIONS

English Abstract for NL 1018187 (2001).
Abstract for EP 0741163 (1996).
Abstract for EP 0723990 (1996).
Research Disclosure, Jan. 1993/32–34.

*Primary Examiner*—Kriellion A. Sanders
(74) *Attorney, Agent, or Firm*—Tyler A. Stevenson

(57) ABSTRACT

A composition containing
polypropylene prepared by polymerization over a metallocene catalyst or a polypropylene copolymer prepared by polymerization over a metallocene catalyst, and
a stabilizer mixture comprising
(A) for example the compound of the formula (A-I-1-a)

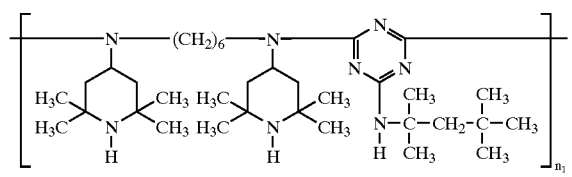

(A-I-1-a)

wherein $n_1$ is a number from 2 to 20; and
(B) for example the compound of the formula (B-I-2-a);

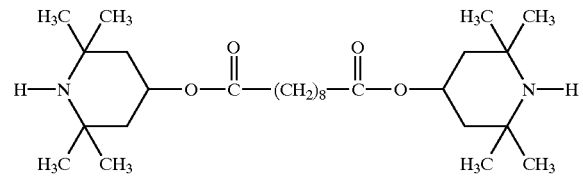

(B-I-2-a)

8 Claims, No Drawings

STABILIZED METALLOCENE POLYPROPYLENE

The present invention relates to a composition containing polypropylene prepared by polymerization over a metallocene catalyst or a polypropylene copolymer prepared by polymerization over a metallocene catalyst, and a specific hindered amine light stabilizer system.

Hindered amine light stabilizer systems are described, for example, in U.S. Pat. Nos. 4,863,981, 5,719,217, EP-A-632,092, EP-A-741,163, EP-A-723,990, GB-A-2,267,499 and Research Disclosure 34,549 (Jan. 1993). EP-A-814,127 discloses embrittlement-resistant polyolefin compositions. U.S. Pat. No. 5,955,522 describes a process for the preparation of olefin polymers by polymerization over a transition metallocene catalyst with the addition of a sterically hindered amine. Stabilized metallocene polyolefins are also known from GB-A-2,346,147.

In more detail, the present invention relates to a composition containing polypropylene prepared by polymerization over a metallocene catalyst or a polypropylene copolymer prepared by polymerization over a metallocene catalyst, and
a stabilizer mixture comprising (A) a compound of the formula (A-I) or a product (A-II) or a compound of the formula (A-III);

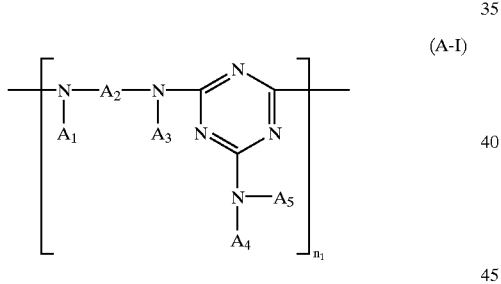

(A-I)

wherein
$A_1$, $A_3$, $A_4$ and $A_5$ independently of one another are hydrogen, $C_1$–$C_{12}$alkyl, $C_5$–$C_{12}$cycloalkyl, $C_1$–$C_4$alkyl-substituted $C_5$–$C_{12}$cycloalkyl, phenyl, —OH— and/or $C_1$–$C_{10}$alkyl-substituted phenyl, $C_7$–$C_9$phenylalkyl, $C_7$–$C_9$phenylalkyl which is substituted on the phenyl radical by —OH and/or $C_1$–$C_{10}$alkyl; or a group of the formula (a-1),

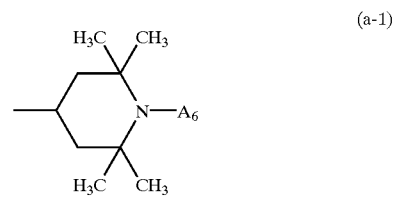

(a-1)

with $A_6$ being hydrogen, $C_1$–$C_8$alkyl, —O, —OH, —CH$_2$CN, $C_1$–$C_{18}$alkoxy, $C_5$–$C_{12}$cycloalkoxy, $C_3$–$C_6$alkenyl, $C_7$–$C_9$phenylalkyl unsubstituted or substituted on the phenyl by 1, 2 or 3 $C_1$–$C_4$alkyl; or $C_1$–$C_8$acyl, $A_2$ is $C_2$–$C_{18}$alkylene, $C_5$–$C_7$cycloalkylene or $C_1$–$C_4$alkylenedi($C_5$–$C_7$cycloalkylene), or the radicals $A_1$, $A_2$ and $A_3$, together with the nitrogen atoms to which they are attached, form a 5- to 10-membered heterocyclic ring, or $A_4$ and $A_5$, together with the nitrogen atom to which they are attached, form a 5- to 10-membered heterocyclic ring, $n_1$ is a number from 2 to 50, and
at least one of the radicals $A_1$, $A_3$, $A_4$ and $A_5$ is a group of the formula (a-1);

a product (A-II) obtainable by reacting a product, obtained by reaction of a polyamine of the formula (A-II-1) with cyanuric chloride, with a compound of the formula (A-II-2)

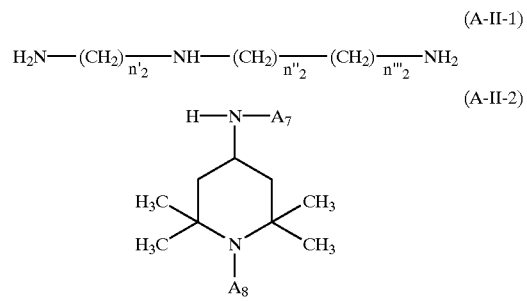

in which
$n'_2$, $n''_2$ and $n'''_2$ independently of one another are a number from 2 to 12, $A_7$ is hydrogen, $C_1$–$C_{12}$alkyl, $C_5$–$C_{12}$cycloalkyl, phenyl or $C_7$–$C_9$phenylalkyl, and $A_8$ has one of the meanings of $A_6$;

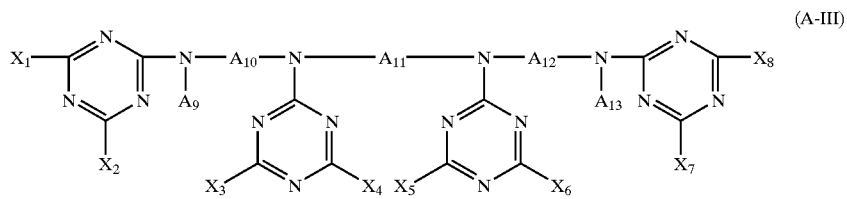

(A-III)

wherein
$A_9$ and $A_{13}$ independently of one another are hydrogen or $C_1$–$C_{12}$alkyl,
$A_{10}$, $A_{11}$ and $A_{12}$ independently of one another are $C_2$–$C_{10}$alkylene, and
$X_1$, $X_2$, $X_3$, $X_4$, $X_5$, $X_6$, $X_7$ and $X_8$ independently of one another are a group of the formula (V),

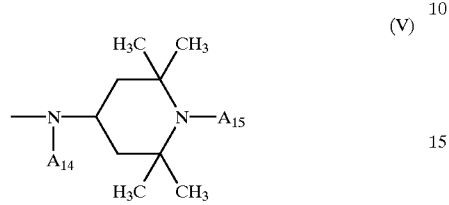

(V)

in which $A_{14}$ is hydrogen, $C_1$–$C_{12}$alkyl, $C_5$–$C_{12}$cycloalkyl, $C_1$–$C_4$alkyl-substituted $C_5$–$C_{12}$cycloalkyl, phenyl, —OH— and/or $C_1$–$C_{10}$alkyl-substituted phenyl, $C_7$–$C_9$phenylalkyl, $C_7$–$C_9$phenylalkyl which is substituted on the phenyl radical by —OH and/or $C_1$–$C_{10}$alkyl; or a group of the formula (a-1) as defined above, and $A_{15}$ has one of the meanings of $A_6$; and (B) a compound of the formula (B-I), (B-II) or (B-III);

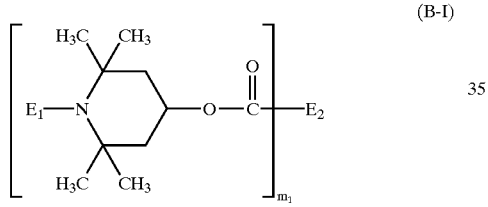

(B-I)

in which
$E_1$ is hydrogen, $C_1$–$C_8$alkyl, —O, —OH, —CH$_2$CN, $C_1$–$C_{18}$alkoxy, $C_1$–$C_{18}$alkoxy substituted by —OH; $C_5$–$C_{12}$cycloalkoxy, $C_3$–$C_6$alkenyl, $C_7$–$C_9$phenylalkyl unsubstituted or substituted on the phenyl by 1, 2 or 3 $C_1$–$C_4$alkyl; or $C_1$–$C_8$acyl,
$m_1$ is 1, 2 or 4,
if $m_1$ is 1, $E_2$ is $C_1$–$C_{25}$alkyl,
if $m_1$ is 2, $E_2$ is $C_1$–$C_{14}$alkylene or a group of the formula (b-1)

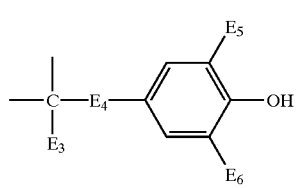

(b-1)

wherein $E_3$ is $C_1$–$C_{10}$alkyl or $C_2$–$C_{10}$alkenyl, $E_4$ is $C_1$–$C_{10}$alkylene, and $E_5$ and $E_6$ independently of one another are $C_1$–$C_4$alkyl, cyclohexyl or methylcyclohexyl, and if $m_1$ is 4, $E_2$ is $C_4$–$C_{10}$alkanetetrayl;

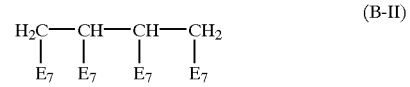

(B-II)

in which
two of the radicals $E_7$ are —COO—($C_1$–$C_{20}$alkyl), and
two of the radicals $E_7$ are a group of the formula (b-2)

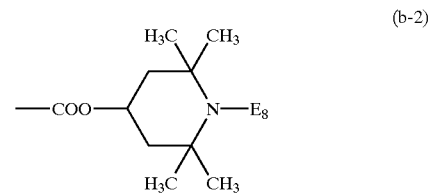

(b-2)

with $E_8$ having one of the meanings of $E_1$;

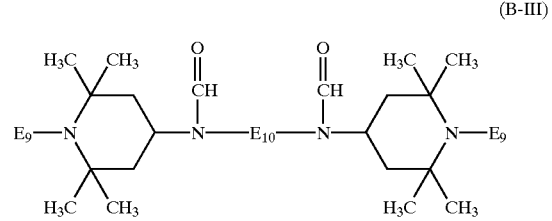

(B-III)

wherein
the radicals $E_9$ independently of one another have one of the meanings of $E_1$, and $E_{10}$ is $C_2$–$C_{22}$alkylene, $C_5$–$C_7$cycloalkylene, $C_1$–$C_4$alkylenedi ($C_5$–$C_7$cycloalkylene), phenylene or phenylenedi ($C_1$–$C_4$alkylene).

Examples of alkyl having up to 25 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl and docosyl. One of the preferred definitions of $A_6$, $A_8$, $E_1$, $E_8$ and $E_9$ is $C_1$–$C_4$alkyl, especially methyl. $A_7$ is preferably butyl.

Examples of alkoxy having up to 18 carbon atoms are methoxy, ethoxy, propoxy, isopropoxy, butoxy, isobutoxy, pentoxy, isopentoxy, hexoxy, heptoxy, octoxy, decyloxy, dodecyloxy, tetradecyloxy, hexadecyloxy and octadecyloxy. One of the preferred meanings of $A_6$, $A_8$, $E_1$, $E_8$ and $E_9$ is propoxy or octoxy.

A preferred example of $C_1$–$C_{18}$alkoxy substituted by —OH is 2-hydroxy-2-methylpropoxy.

Examples of $C_5$–$C_{12}$cycloalkyl are cyclopentyl, cyclohexyl, cycloheptyl, cyclooctyl and cyclododecyl. $C_5$–$C_8$Cycloalkyl, especially cyclohexyl, is preferred.

$C_1$–$C_4$Alkyl-substituted $C_5$–$C_{12}$cycloalkyl is for example methylcyclohexyl or dimethylcyclohexyl.

Examples of $C_5$–$C_{12}$cycloalkoxy are cyclopentoxy, cyclohexoxy, cycloheptoxy, cyclooctoxy, cyclodecyloxy and cyclododecyloxy. $C_5$–$C_8$Cycloalkoxy, in particular cyclopentoxy and cyclohexoxy, is preferred.

—OH— and/or $C_1$–$C_{10}$alkyl-substituted phenyl is for example methylphenyl, dimethylphenyl, trimethylphenyl, tert-butylphenyl or 3,5-di-tert-butyl-4-hydroxyphenyl.

Examples of $C_7$–$C_9$phenylalkyl are benzyl and phenylethyl.

$C_7$–$C_9$Phenylalkyl which is substituted on the phenyl radical by —OH and/or by alkyl having up to 10 carbon atoms is for example methylbenzyl, dimethylbenzyl, trimethylbenzyl, tert-butylbenzyl or 3,5-di-tert-butyl-4-hydroxybenzyl.

Examples of alkenyl having up to 10 carbon atoms are allyl, 2-methallyl, butenyl, pentenyl and hexenyl. Allyl is preferred. The carbon atom in position 1 is preferably saturated.

Examples of acyl containing not more than 8 carbon atoms are formyl, acetyl, propionyl, butyryl, pentanoyl, hexanoyl, heptanoyl, octanoyl, acryloyl, methacryloyl and benzoyl. $C_1$–$C_8$Alkanoyl, $C_3$–$C_8$alkenyl and benzoyl are preferred. Acetyl and acryloyl are especially preferred.

Examples of alkylene having up to 22 carbon atoms are methylene, ethylene, propylene, trimethylene, tetramethylene, pentamethylene, 2,2-dimethyltrimethylene, hexamethylene, trimethylhexamethylene, octamethylene and decamethylene.

An example of $C_4$–$C_{10}$alkanetetrayl is 1,2,3,4-butanetetrayl.

An example of $C_5$–$C_7$cycloalkylene is cyclohexylene.

An example of $C_1$–$C_4$alkylenedi($C_5$–$C_7$cycloalkylene) is methylenedicyclohexylene.

An example of phenylenedi($C_1$–$C_4$alkylene) is methylene-phenylene-methylene or ethylene-phenylene-ethylene.

Where the radicals $A_1$, $A_2$ and $A_3$, together with the nitrogen atoms to which they are attached, form a 5- to 10-membered heterocyclic ring, this ring is for example

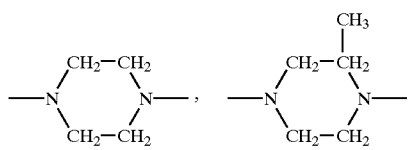

A 6-membered heterocyclic ring is preferred.

Where the radicals $A_4$ and $A_5$, together with the nitrogen atom to which they are attached, form a 5- to 10-membered heterocyclic ring, this ring is for example 1-pyrrolidyl, piperidino, morpholino, 1-piperazinyl, 4-methyl-1-piperazinyl, 1-hexahydroazepinyl, 5,5,7-trimethyl-1-homopiperazinyl or 4,5,5,7-tetramethyl-1-homopiperazinyl. Morpholino is particularly preferred.

$n_1$ is preferably a number from 2 to 25, in particular 2 to 20, $n'_2$ and $n'''_2$ are preferably 3 and $n''_2$ is preferably 2.

$A_6$, $A_8$, $E_1$, $E_8$ and $E_9$ are preferably hydrogen, $C_1$–$C_4$alkyl or $C_1$–$C_8$alkoxy.

The compounds described above as components (A) and (B) are essentially known and commercially available. All of them can be prepared by known processes.

The preparation of the compounds of component (A) is disclosed, for example, in U.S. Pat. Nos. 4,086,204, 6,046, 304, 4,331,586 and 4,477,615 (CAS 136,504-96-6), and in U.S. Pat. No. 4,108,829.

The preparation of the compounds of component (B) is for example disclosed in U.S. Pat. Nos. 5,679,733, 3,640, 928, 4,198,334, 5,204,473, 4,619,958, 4,110,306 and 4,976, 889.

The product (A-II) can be prepared analogously to known processes, for example by reacting a polyamine of formula (A-II-1) with cyanuric chloride in a molar ratio of from 1:2 to 1:4 in the presence of anhydrous lithium carbonate, sodium carbonate or potassium carbonate in an organic solvent such as 1,2-dichloroethane, toluene, xylene, benzene, dioxane or tert-amyl alcohol at a temperature of from −20° C. to +10° C., preferably from −10° C. to +10° C., in particular from 0° C. to +10° C., for from 2 to 8 hours, followed by reaction of the resultant product with a 2,2,6, 6-tetramethyl-4-piperidylamine of the formula (A-II-2). The molar ratio of the 2,2,6,6-tetramethyl-4-piperidylamine to polyamine of the formula (A-II-1) employed is for example from 4:1 to 8:1. The quantity of the 2,2,6,6-tetramethyl-4-piperidylamine can be added in one portion or in more than one portion at intervals of a few hours.

The molar ratio of polyamine of the formula (A-II-1) to cyanuric chloride to 2,2,6,6-tetramethyl-4-piperidylamine of the formula (A-II-2) is preferably from 1:3:5 to 1:3:6.

The following example indicates one way of preparing the preferred product (A-II-a).

EXAMPLE 23.6 g (0.128 mol) of cyanuric chloride, 7.43 g (0.0426 mol) of N,N'-bis[3-aminopropyl]ethylenediamine and 18 g (0.13 mol) of anhydrous potassium carbonate are reacted at 5° C. for 3 hours with stirring in 250 ml of 1,2-dichloroethane. The mixture is warmed at room temperature for a further 4 hours. 27.2 g (0.128 mol) of N-(2,2,6,6-tetramethyl-4-piperidyl)butylamine are added and the resultant mixture is warmed at 60° C. for 2 hours. A further 18 g (0.13 mol) of anhydrous potassium carbonate are added and the mixture is warmed at 60° C. for a further 6 hours. The solvent is removed by distillation under a slight vacuum (200 mbar) and replaced by xylene. 18.2 g (0.085 mol) of N-(2,2,6,6-tetramethyl-4-piperidyl)butylamine and 5.2 g (0.13 mol) of ground sodium hydroxide are added, the mixture is heated at reflux for 2 hours and, for a further 12 hours, the water formed during the reaction is removed by azeotropic distillation. The mixture is filtered. The solution is washed with water and dried over $Na_2SO_4$. The solvent is evaporated and the residue is dried at 120–130° C. in vacuo (0.1 mbar). The desired product is obtained as a colourless resin.

In general, the product (A-II) can, for example, be represented by a compound of the formula (A-II-α), (A-II-β) or (A-II-γ). It can also be in the form of a mixture of these three compounds.

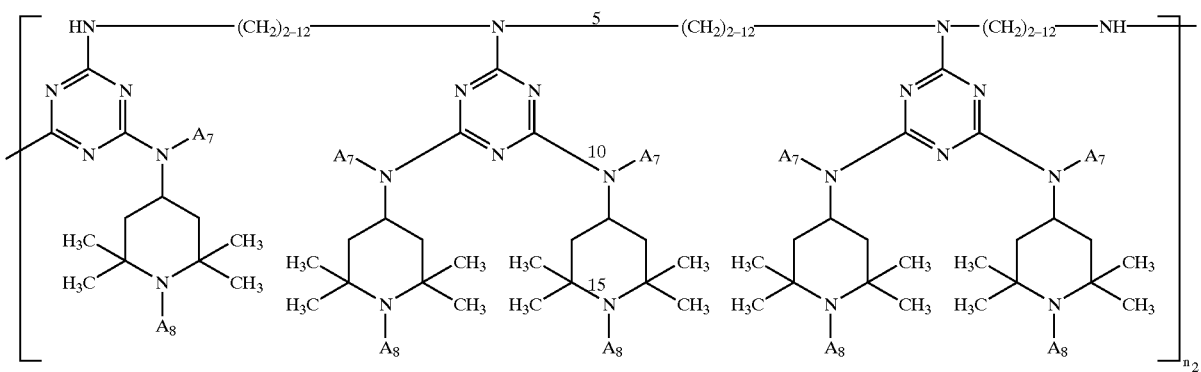
(A-II-α)
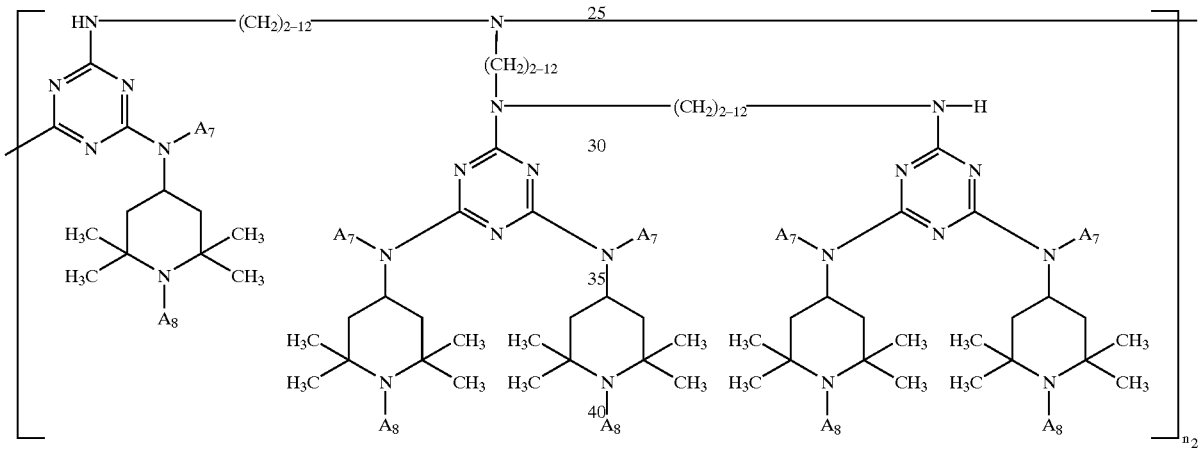
(A-II-β)
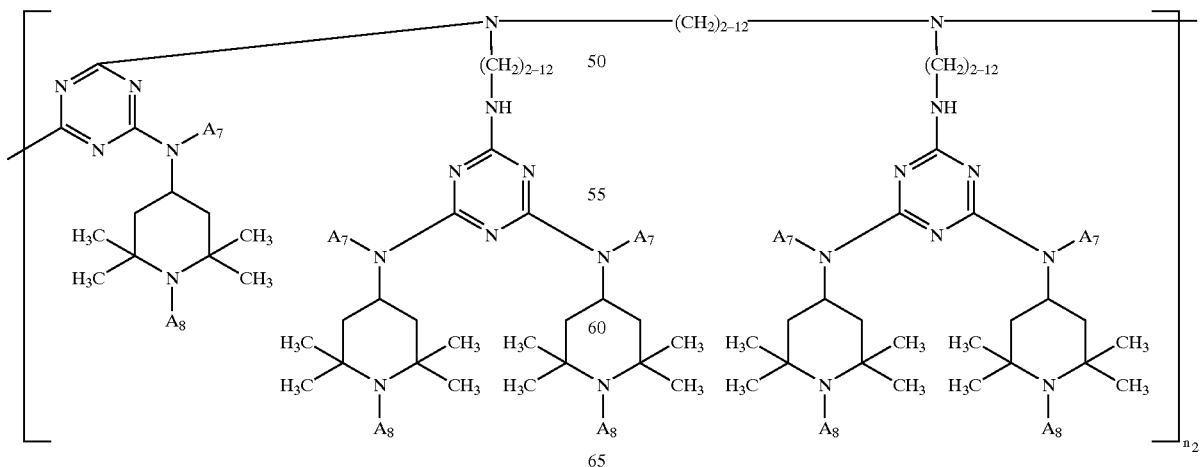
(A-II-γ)

A preferred meaning of the formula (A-II-α) is
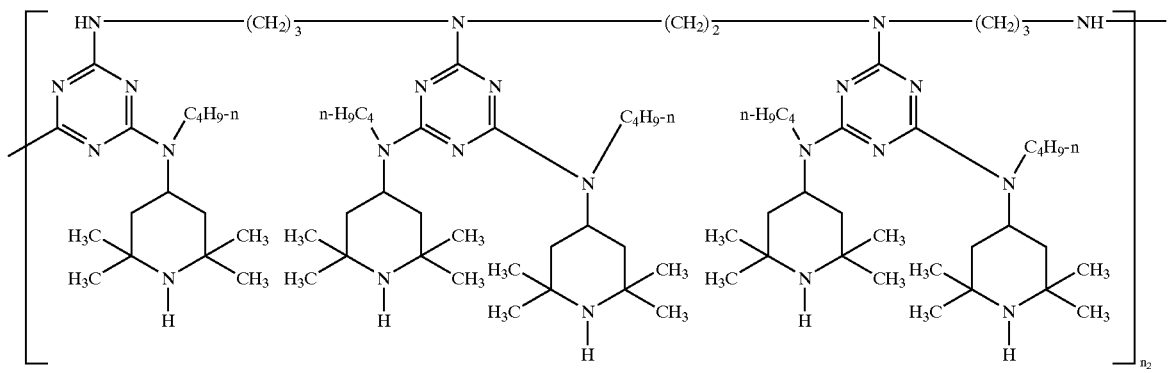
A preferred meaning of the formula (A-II-β) is
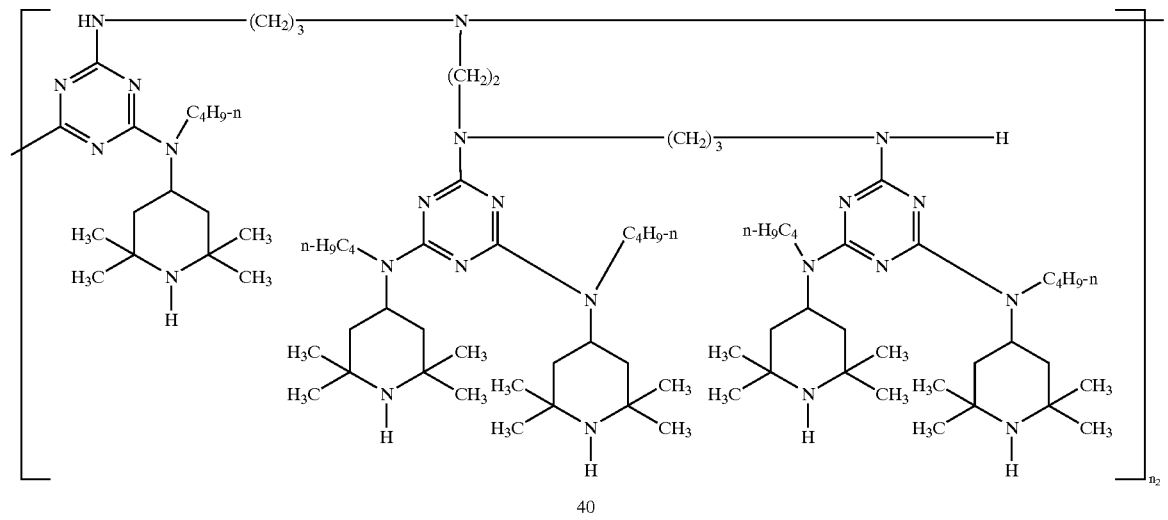
A preferred meaning of the formula (A-II-γ) is
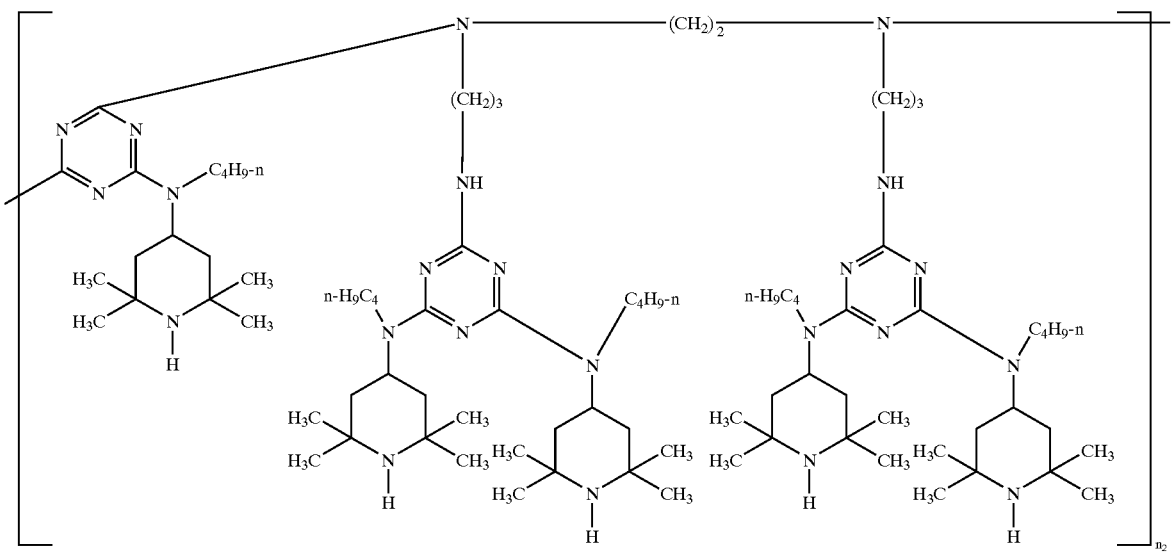

In the above formulae (A-II-β) to (A-II-γ), $n_2$ is preferably 2 to 20, in particular 2 to 10.

The component (A) is preferably selected from the group consisting of the following commercial products:

CHIMASSORB 944 (RTM), CHIMASSORB 2020 (RTM), CYASORB UV 3346 (RTM), CYASORB UV 3529 (RTM), DASTIB 1082 (RTM), UVASORB HA 88 (RTM) and CHIMASSORB 119 (RTM).

The component (B) is preferably selected from the group consisting of the following commercial products:

DASTIB 845 (RTM), TINUVIN 770 (RTM), TINUVIN 765 (RTM), TINUVIN 123 (RTM), TINUVIN 144 (RTM), ADK STAB LA 52 (RTM), ADK STAB LA 57 (RTM), ADK STAB LA 62 (RTM), ADK STAB LA 67 (RTM) and UVINUL 4050 H (RTM).

The meanings of the terminal groups which saturate the free valences in the compounds of the formulae (A-I), (A-II-α), (A-II-β) and (A-II-γ) depend on the processes used for their preparation. The terminal groups can also be modified after the preparation of the compounds.

If the compounds of the formula (A-I) are prepared by reacting a compound of the formula

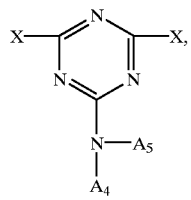

in which X is, for example, halogen, in particular chlorine, and $A_4$ and $A_5$ are as defined above, with a compound of the formula

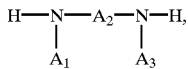

in which $A_1$, $A_2$ and $A_3$ are as defined above, the terminal group bonded to the diamino radical is hydrogen or

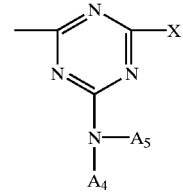

and the terminal group bonded to the triazine radical is X or

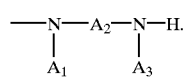

If X is halogen, it is advantageous to replace this, for example, by —OH or an amino group when the reaction is complete. Examples of amino groups which may be mentioned are pyrrolidin-1-yl, morpholino, —NH$_2$, —N(C$_1$–C$_8$alkyl)$_2$ and —NR*(C$_1$–C$_8$alkyl), in which R* is hydrogen or a group of the formula (a-1).

The compounds of the formula (A-I) also cover compounds of the formula

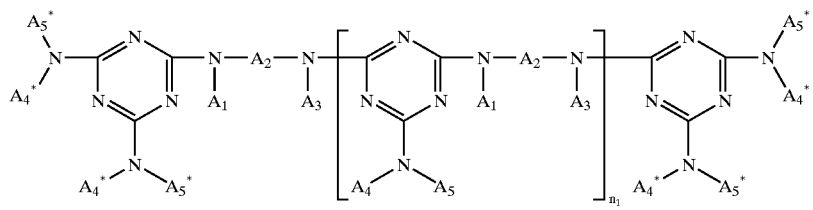

wherein $A_1$, $A_2$, $A_3$, $A_4$, $A_5$ and $n_1$ are as defined above and $A_4^*$ has one of the meanings of $A_4$ and $A_5^*$ has one of the meanings of $A_5$.

One of the particularly preferred compounds of the formula (A-I) is

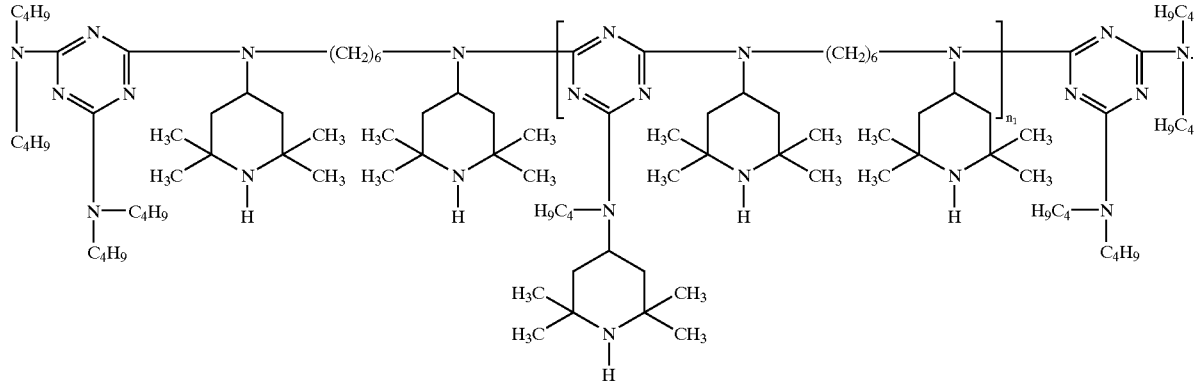

The preparation of this compound is described in Example 10 of U.S. Pat. No. 6,046,304.

In the compounds of the formulae (A-II-α), (A-II-β) and (A-II-γ), the terminal group bonded to the triazine radical is, for example, Cl or a

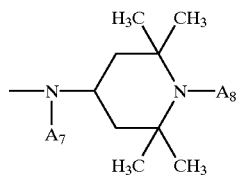

group, and the terminal group bonded to the amino radical is, for example, hydrogen or a

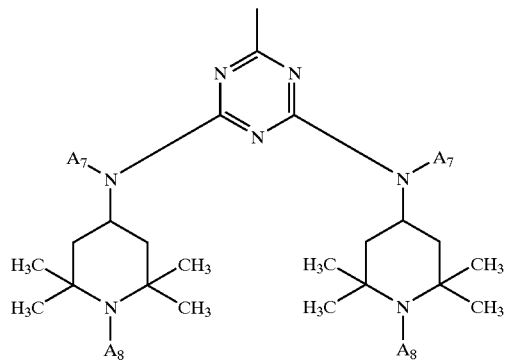

group.

According to a preferred embodiment, $A_1$, $A_3$, $A_4$ and $A_5$ independently of one another are hydrogen, $C_1$–$C_8$alkyl, $C_5$–$C_8$cycloalkyl, methyl-substituted $C_5$–$C_8$cycloalkyl, phenyl, $C_7$–$C_9$phenylalkyl or a group of the formula (II), or the radicals $A_4$ and $A_5$, together with the nitrogen atom to which they are attached, form a 6-membered heterocyclic ring, $A_2$ is $C_2$–$C_{10}$alkylene, and $n_1$ is a number from 2 to 25;

$n'_2$, $n''_2$ and $n'''_2$ independently of one another are a number from 2 to 4, and $A_7$ is hydrogen, $C_1$–$C_4$alkyl, $C_5$–$C_8$cycloalkyl, phenyl or benzyl;

$m_1$ is 1, 2 or 4, if $m_1$ is 1, $E_2$ is $C_{12}$–$C_{20}$alkyl, if $m_1$ is 2, $E_2$ is $C_2$–$C_{10}$alkylene or a group of the formula (b-1), $E_3$ is $C_1$–$C_4$alkyl, $E_4$ is $C_1$–$C_6$alkylene, and $E_5$ and $E_6$ independently of one another are $C_1$–$C_4$alkyl, and if $m_1$ is 4, $E_2$ is $C_4$–$C_8$alkanetetrayl; two of the radicals $E_7$ are —COO—($C_{10}$–$C_{15}$alkyl), and two of the radicals $E_7$ are a group of the formula (b-2); and $E_{10}$ is $C_2$–$C_8$alkylene.

According to a particularly preferred embodiment, component (A) is a compound of the formula (A-I-1), (A-I-2), (A-I-3) or (A-I-4), or a product (A-II-a) or a compound of the formula (A-III-1);

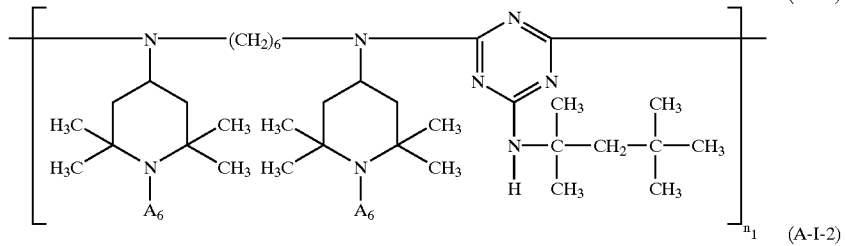
(A-I-1)

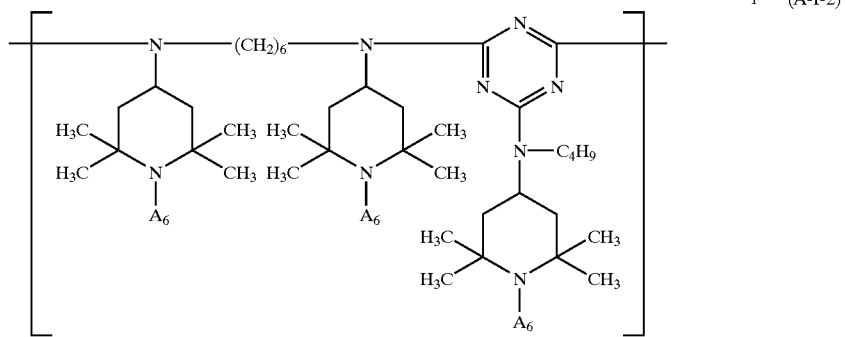
(A-I-2)

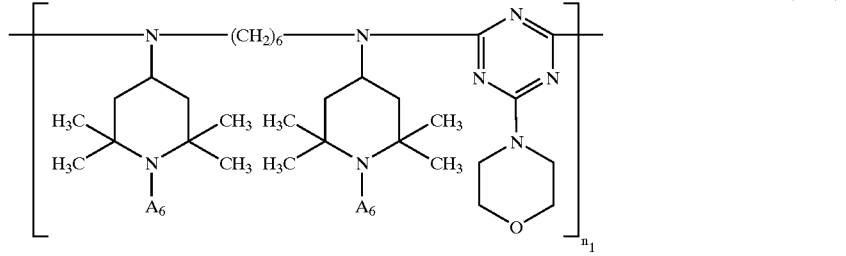
(A-I-3)

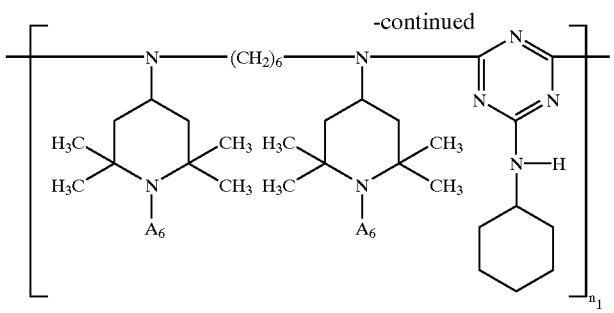
(A-I-4)

wherein $A_6$ is hydrogen, $C_1$–$C_4$alkyl or $C_1$–$C_8$alkoxy and $n_1$ is a number from 2 to 25;

a product (A-II-a) obtainable by reacting a product, obtained by reaction of a polyamine of the formula (A-II-1-a) with cyanuric chloride, with a compound of the formula (A-II-2-a)

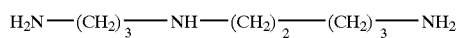
(A-II-1-a)

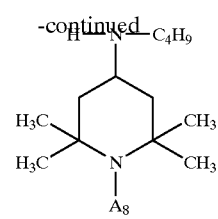
(A-II-2-a)

wherein $A_8$ is hydrogen $C_1$–$C_4$alkyl or $C_1$–$C_8$alkoxy;

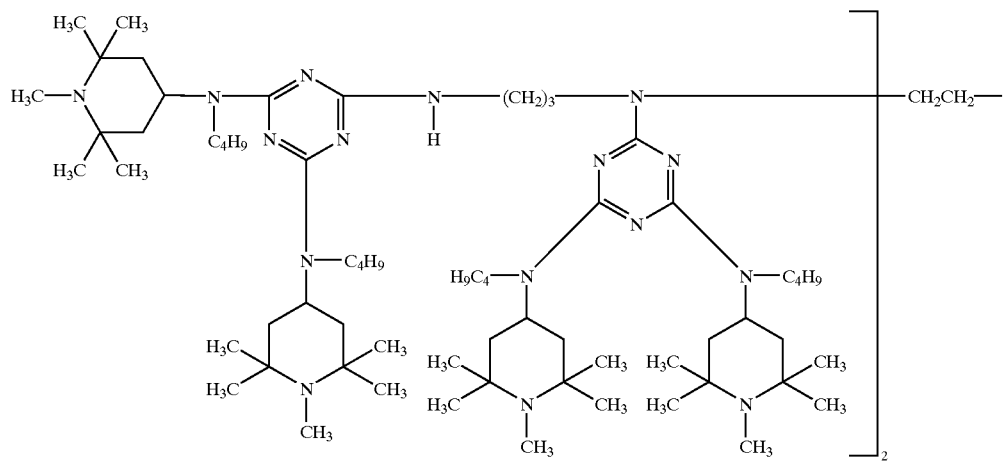
(A-III-1)

and component B) is a compound of the formula (B-I-1), (B-I-2), (B-I-3), (B-I-4), (B-II-1) or (B-III-1);

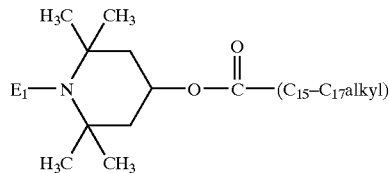
(B-I-1)

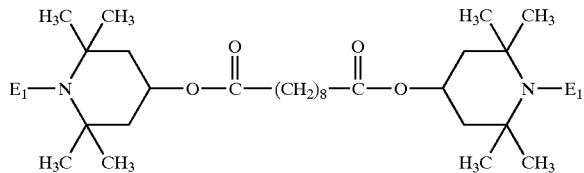
(B-I-2)

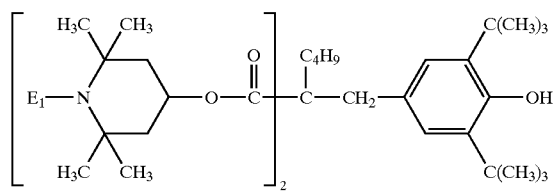
(B-I-3)

-continued

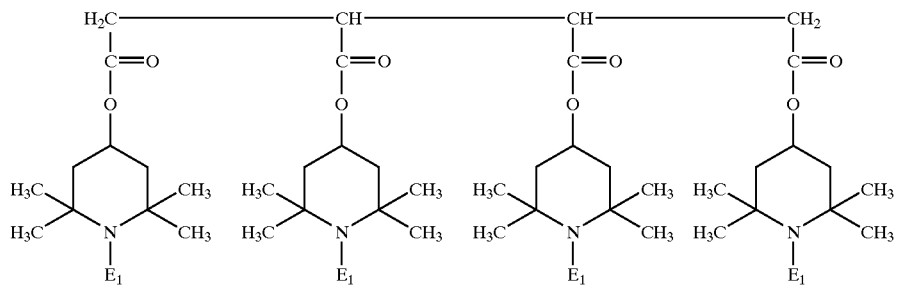
(B-I-4)

wherein $E_1$ is hydrogen, $C_1$–$C_4$alkyl, $C_1$–$C_4$alkoxy or $C_1$–$C_4$alkoxy substituted by —OH;

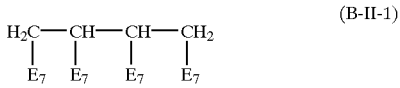
(B-II-1)

in which two of the radicals $E_7$ are —COO—$C_{13}H_{27}$ and two of the radicals $E_7$ are

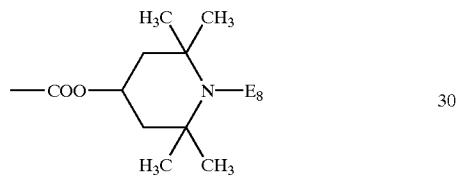

and $E_8$ has one of the meanings of $E_1$;

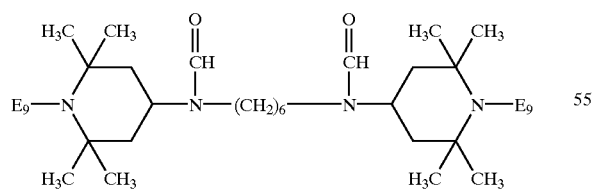
(B-III-1)

wherein $E_9$ has one of the meanings of $E_1$.

A composition of interest is one wherein component (A) is a compound of the formula (A-I-1) and component (B) is a compound of the formula (B-I-1), (B-I-2), (B-I-3), (B-I-4), (B-II-1) or (B-III-1); or component (A) is a compound of the formula (A-I-2) and component (B) is a compound of the formula (B-I-1), (B-I-2), (B-I-3), (B-I-4), (B-II-1) or (B-III-1); or component (A) is a compound of the formula (A-I-3) and component (B) is a compound of the formula (B-I-1), (B-I-2), (B-I-3), (B-I-4), (B-II-1) or (B-III-1); or component (A) is a compound of the formula (A-I-4) and component (B) is a compound of the formula (B-I-1), (B-I-2), (B-I-3), (B-I-4), (B-II-1) or (B-III-1); or component (A) is a product (A-II-a) and component (B) is a compound of the formula (B-I-1), (B-I-2), (B-I-3), (B-I-4), (B-II-1) or (B-III-1); or component (A) is a compound of the formula (A-III-1) and component (B) is a compound of the formula (B-I-1), (B-I-2), (B-I-3), (B-I-4), (B-II-1) or (B-III-1).

A composition of particular interest is one wherein component (A) corresponds to the compound of the formula (A-I-1-a)

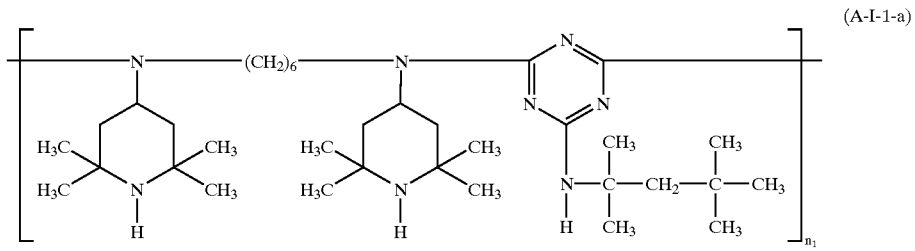
(A-I-1-a)

wherein $n_1$ is a number from 2 to 20; and component (B) corresponds to the compound of the formula (B-I-2-a).

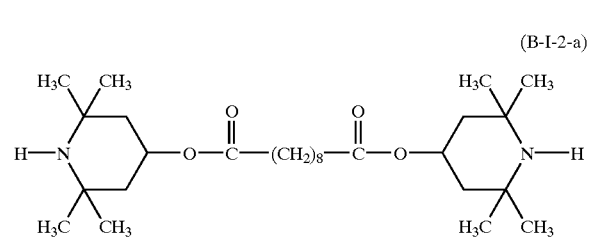
(B-I-2-a)

A further composition of particular interest is one wherein component (A) corresponds to the compound of the formula (A-I-2-a) or (A-III-1)

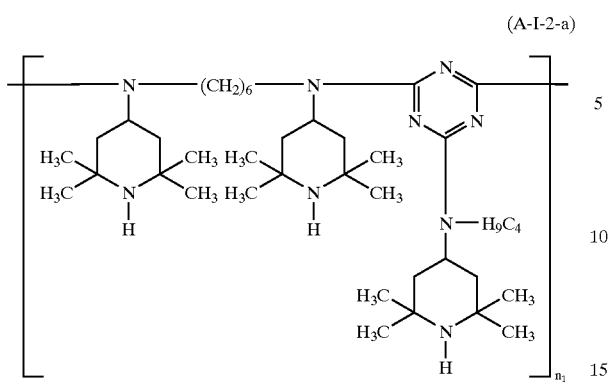

wherein $n_1$ is a number from 2 to 20;

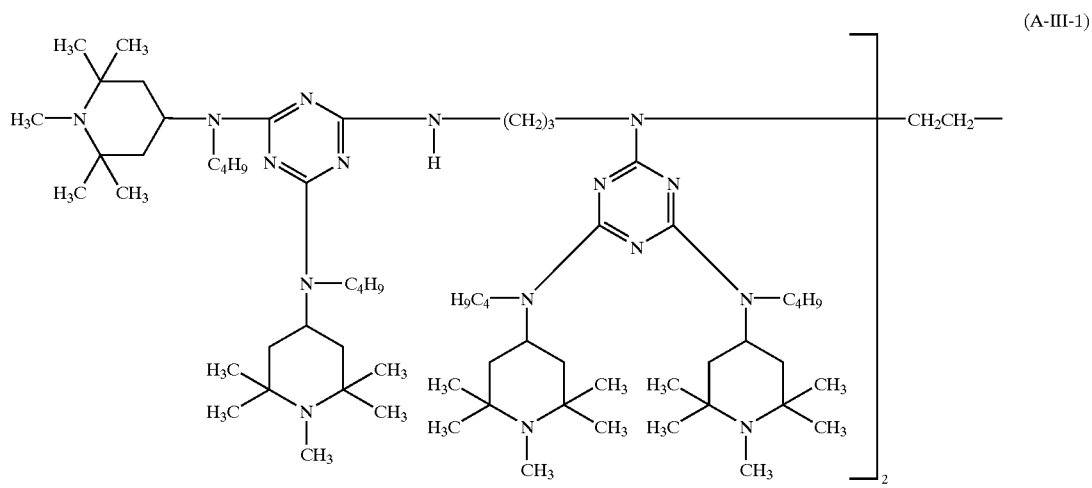

and component (B) corresponds to the compound of the formula (B-I-2-a).

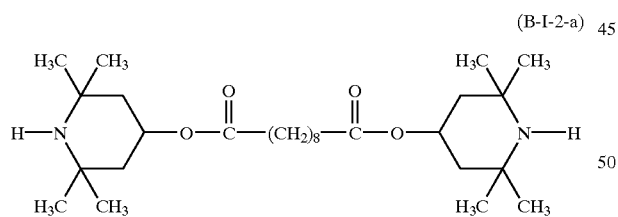

Examples of preferred stabilizer mixtures are listed in the following.

1. CHIMASSORB 944 (RTM)+DASTIB 845 (RTM)
2. CHIMASSORB 944 (RTM)+TINUVIN 770 (RTM)
3. CHIMASSORB 944 (RTM)+TINUVIN 765 (RTM)
4. CHIMASSORB 944 (RTM)+TINUVIN 123 (RTM)
5. CHIMASSORB 944 (RTM)+TINUVIN 144 (RTM)
6. CHIMASSORB 944 (RTM)+ADK STAB LA 52 (RTM)
7. CHIMASSORB 944 (RTM)+ADK STAB LA 57 (RTM)
8. CHIMASSORB 944 (RTM)+ADK STAB LA 62 (RTM)
9. CHIMASSORB 944 (RTM)+ADK STAB LA 67 (RTM)
10. CHIMASSORB 944 (RTM)+UVINUL 4050 H (RTM)
11. CHIMASSORB 2020 (RTM)+DASTIB 845 (RTM)
12. CHIMASSORB 2020 (RTM)+TINUVIN 770 (RTM)
13. CHIMASSORB 2020 (RTM)+TINUVIN 765 (RTM)
14. CHIMASSORB 2020 (RTM)+TINUVIN 123 (RTM)
15. CHIMASSORB 2020 (RTM)+TINUVIN 144 (RTM)
16. CHIMASSORB 2020 (RTM)+ADK STAB LA 52 (RTM)
17. CHIMASSORB 2020 (RTM)+ADK STAB LA 57 (RTM)
18. CHIMASSORB 2020 (RTM)+ADK STAB LA 62 (RTM)
19. CHIMASSORB 2020 (RTM)+ADK STAB LA 67 (RTM)
20. CHIMASSORB 2020 (RTM)+UVINUL 4050 H (RTM)
21. CYASORB UV 3346 (RTM)+DASTIB 845 (RTM)
22. CYASORB UV 3346 (RTM)+TINUVIN 770 (RTM)
23. CYASORB UV 3346 (RTM)+TINUVIN 765 (RTM)
24. CYASORB UV 3346 (RTM)+TINUVIN 123 (RTM)
25. CYASORB UV 3346 (RTM)+TINUVIN 144 (RTM)
26. CYASORB UV 3346 (RTM)+ADK STAB LA 52 (RTM)
27. CYASORB UV 3346 (RTM)+ADK STAB LA 57 (RTM)
28. CYASORB UV 3346 (RTM)+ADK STAB LA 62 (RTM)
29. CYASORB UV 3346 (RTM)+ADK STAB LA 67 (RTM)
30. CYASORB UV 3346 (RTM)+UVINUL 4050 H (RTM)
31. CYASORB UV 3529 (RTM)+DASTIB 845 (RTM)
32. CYASORB UV 3529 (RTM)+TINUVIN 770 (RTM)
33. CYASORB UV 3529 (RTM)+TINUVIN 765 (RTM)
34. CYASORB UV 3529 (RTM)+TINUVIN 123 (RTM)
35. CYASORB UV 3529 (RTM)+TINUVIN 144 (RTM)
36. CYASORB UV 3529 (RTM)+ADK STAB LA 52 (RTM)
37. CYASORB UV 3529 (RTM)+ADK STAB LA 57 (RTM)

38. CYASORB UV 3529 (RTM)+ADK STAB LA 62 (RTM)
39. CYASORB UV 3529 (RTM)+ADK STAB LA 67 (RTM)
40. CYASORB UV 3529 (RTM)+UVINUL 4050 H (RTM)
41. DASTIB 1082 (RTM)+DASTIB 845 (RTM)
42. DASTIB 1082 (RTM)+TINUVIN 770 (RTM)
43. DASTIB 1082 (RTM)+TINUVIN 765 (RTM)
44. DASTIB 1082 (RTM)+TINUVIN 123 (RTM)
45. DASTIB 1082 (RTM)+TINUVIN 144 (RTM)
46. DASTIB 1082 (RTM)+ADK STAB LA 52 (RTM)
47. DASTIB 1082 (RTM)+ADK STAB LA 57 (RTM)
48. DASTIB 1082 (RTM)+ADK STAB LA 62 (RTM)
49. DASTIB 1082 (RTM)+ADK STAB LA 67 (RTM)
50. DASTIB 1082 (RTM)+UVINUL 4050 H (RTM)
51. UVASORB HA 88 (RTM)+DASTIB 845 (RTM)
52. UVASORB HA 88 (RTM)+TINUVIN 770 (RTM)
53. UVASORB HA 88 (RTM)+TINUVIN 765 (RTM)
54. UVASORB HA 88 (RTM)+TINUVIN 123 (RTM)
55. UVASORB HA 88 (RTM)+TINUVIN 144 (RTM)
56. UVASORB HA 88 (RTM)+ADK STAB LA 52 (RTM)
57. UVASORB HA 88 (RTM)+ADK STAB LA 57 (RTM)
58. UVASORB HA 88 (RTM)+ADK STAB LA 62 (RTM)
59. UVASORB HA 88 (RTM)+ADK STAB LA 67 (RTM)
60. UVASORB HA 88 (RTM)+UVINUL 4050 H (RTM)
61. CHIMASSORB 119 (RTM)+DASTIB 845 (RTM)
62. CHIMASSORB 119 (RTM)+TINUVIN 770 (RTM)
63. CHIMASSORB 119 (RTM)+TINUVIN 765 (RTM)
64. CHIMASSORB 119 (RTM)+TINUVIN 123 (RTM)
65. CHIMASSORB 119 (RTM)+TINUVIN 144 (RTM)
66. CHIMASSORB 119 (RTM)+ADK STAB LA 52 (RTM)
67. CHIMASSORB 119 (RTM)+ADK STAB LA 57 (RTM)
68. CHIMASSORB 119 (RTM)+ADK STAB LA 62 (RTM)
69. CHIMASSORB 119 (RTM)+ADK STAB LA 67 (RTM)
70. CHIMASSORB 119 (RTM)+UVINUL 4050 H (RTM)

The commercial product CHIMASSORB 944 (RTM) corresponds to the compound of the formula (A-I-1) wherein $A_6$ is hydrogen.

The commercial product CHIMASSORB 2020 (RTM) corresponds to the compound of the formula (A-I-2) wherein $A_6$ is hydrogen.

The commercial product CYASORB UV 3346 (RTM) corresponds to the compound of the formula (A-I-3) wherein $A_6$ is hydrogen.

The commercial product CYASORB UV 3529 (RTM) corresponds to the compound of the formula (A-I-3) wherein $A_6$ is methyl.

The commercial product DASTIB 1082 (RTM) corresponds to the compound of the formula (A-I-4) wherein $A_6$ is hydrogen.

The commercial product UVASORB HA 88 (RTM) corresponds to the product (A-II-a) wherein $A_8$ is hydrogen.

The commercial product CHIMASSORB 119 (RTM) corresponds to the compound of the formula (A-III-1).

The commercial product DASTIB 845 (RTM) corresponds to the compound of the formula (B-I-1) wherein $E_1$ is hydrogen.

The commercial product TINUVIN 770 (RTM) corresponds to the compound of the formula (B-I-2) wherein $E_1$ is hydrogen.

The commercial product TINUVIN 765 (RTM) corresponds to the compound of the formula (B-I-2) wherein $E_1$ is methyl.

The commercial product TINUVIN 123 (RTM) corresponds to the compound of the formula (B-I-2) wherein $E_1$ is octyloxy.

The commercial product TINUVIN 144 (RTM) corresponds to the compound of the formula (B-I-3) wherein $E_1$ is methyl.

The commercial product ADK STAB LA 57 (RTM) corresponds to the compound of the formula (B-I-4) wherein $E_1$ is hydrogen.

The commercial product ADK STAB LA 52 (RTM) corresponds to the compound of the formula (B-I-4) wherein $E_1$ is methyl.

The commercial product ADK STAB LA 67 (RTM) corresponds to the compound of the formula (B-II-1) with $E_8$ being hydrogen.

The commercial product ADK STAB LA 62 (RTM) corresponds to the compound of the formula (B-II-1) with $E_8$ being methyl.

The commercial product UVINUL 4050 H (RTM) corresponds to the compound of the formula (B-III-1) wherein $E_9$ is hydrogen.

A further preferred embodiment of this invention relates to a composition containing additionally
(X-1) a pigment or
(X-2) an UV absorber or
(X-3) a pigment and an UV absorber.

The pigment (component (X-1)) may be an inorganic or organic pigment.

Examples of inorganic pigments are titanium dioxide, zinc oxide, carbon black, cadmium sulfide, cadmium selenide, chromium oxide, iron oxide, lead oxide and so on.

Examples of organic pigments are azo pigments, anthraquinones, phthalocyanines, tetrachloroisoindolinones, quinacridones, isoindolines, perylenes, pyrrolopyrroles (such as Pigment Red 254) and so on.

All pigments described in "Gächter/Müller: Plastics Additives Handbook, 3rd Edition, Hanser Publishers, Munich Vienna New York", page 647 to 659, point 11.2.1.1 to 11.2.4.2 can be used as component (X-1).

A particularly preferred pigment is titanium dioxide, optionally in combination with an organic pigment.

Examples of such organic pigments are: C.I. (Colour Index) Pigment Yellow 93, C.I. Pigment Yellow 95, C.I. Pigment Yellow 138, C.I. Pigment Yellow 139, C.I. Pigment Yellow 155, C.I. Pigment Yellow 162, C.I. Pigment Yellow 168, C.I. Pigment Yellow 180, C.I. Pigment Yellow 183, C.I. Pigment Red 44, C.I. Pigment Red 170, C.I. Pigment Red 202, C.I. Pigment Red 214, C.I. Pigment Red 254, C.I. Pigment Red 264, C.I. Pigment Red 272, C.I. Pigment Red 48:2, C.I. Pigment Red 48:3, C.I. Pigment Red 53:1, C.I. Pigment Red 57:1, C.I. Pigment Green 7, C.I. Pigment Blue 15:1, C.I. Pigment Blue 15:3 and C.I. Pigment Violet 19.

Examples of the UV absorber (component (X-2)) are a 2-(2'-hydroxyphenyl)benzotriazole, a 2-hydroxybenzophenone, an ester of substituted or unsubstituted benzoic acid, an acrylate, an oxamide, a 2-(2-hydroxyphenyl)-1,3,5-triazine, a monobenzoate of resorcinol or a formamidine.

The 2-(2'-hydroxyphenyl)benzotriazole is e.g. 2-(2'-hydroxy-5'-methylphenyl)-benzotriazole, 2-(3',5'-di-tert-butyl-2'-hydroxyphenyl)benzotriazole, 2-(5'-tert-butyl-2'- hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'hydroxyphenyl)benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5-'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol] or the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$—]$_2$ where R=3'-tert-butyl-4'-hydroxy-5'-2H-benzotriazol-2-ylphenyl.

2-(3',5'-Di-tert-butyl-2'-hydroxyphenyl)-5-chloro-benzotriazole, 2-(3'-tert-butyl-2'-hydroxy-5'methylphenyl)-5-chloro-benzotriazole and 2-(3',5'-di-tert-amyl-2'-hydroxyphenyl)benzotriazole are preferred.

The 2-hydroxybenzophenone is for example the 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy derivatives.

2-Hydroxy-4-octyloxybenzophenone is preferred.

The ester of a substituted or unsubstituted benzoic acid is for example 4-tert-butyl-phenyl salicylate, phenyl salicylate, octylphenyl salicylate, dibenzoyl resorcinol, bis(4-tert-butylbenzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate or 2-methyl-4,6-di-tert-butylphenyl 3,5-di-tert-butyl-4-hydroxybenzoate.

2,4-Di-tert-butylphenyl 3,5-di-tert-butyl-4-hydroxybenzoate and hexadecyl 3,5-di-tert-butyl-4-hydroxybenzoate are preferred.

The acrylate is for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxy-cinnamate, methyl α-carbomethoxy-p-methoxycinnamate or N-(β-carbomethoxy-β-cyanovinyl)-2-methylindoline.

The oxamide is for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide or its mixture with 2-ethoxy-2'-ethyl-5,4'-di-tert-butoxanilide or mixtures of ortho- and para-methoxy-disubstituted oxanilides or mixtures of o- and p-ethoxy-disubstituted oxanilides.

The 2-(2-hydroxyphenyl)-1,3,5-triazine is for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine or 2-(2-hydroxyphenyl)-4-(4-methoxyphenyl)-6-phenyl-1,3,5-triazine.

2-(2-Hydroxy-4-octyloxyphenyl)-4,6-bis(2,4-dimethylphenyl)-1,3,5-triazine and 2-(2-hydroxy-4-hexyloxy)phenyl-4,6-diphenyl-1,3,5-triazine are preferred.

The monobenzoate of resorcinol is for example the compound of the formula

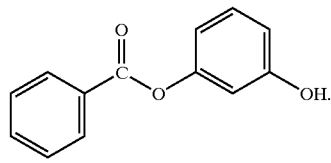

The formamidine is for example the compound of the formula

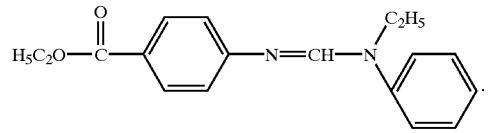

The UV absorber is in particular a 2-(2'-hydroxyphenyl) benzotriazole, a 2-hydroxybenzophenone or a hydroxyphenyltriazine.

A further preferred embodiment of this invention relates to a composition which additionally contains as a further component (XX) an organic salt of Ca, an inorganic salt of Ca, Ca oxide or Ca hydroxide.

Examples of an organic salt of Ca are Ca-stearate, Ca-laurate, Ca-lactate and Ca-stearoyllactate.

Examples of an inorganic salt of Ca are CaCO$_3$, CaCl$_2$, CaF$_2$, Ca$_3$(PO$_4$)$_2$, CaHPO$_4$, Ca(PO$_3$)$_2$, Ca$_2$P$_2$O$_7$, CaSO$_4$ and CaSiO$_3$.

Another preferred embodiment of this invention relates to a composition which additionally contains as a further component (XXX) at least an organic salt of Zn, an inorganic salt of Zn, Zn oxide, Zn hydroxide, an organic salt of Mg, an inorganic salt of Mg, Mg oxide or Mg hydroxide.

The organic salt of zinc or magnesium defined in component (XXX) is preferably a compound of the formula MeL$_2$ in which Me is zinc or magnesium and L is an anion of an organic acid or of an enol. The organic acid can, for example, be a sulfonic acid, sulfinic acid, phosphonic acid or phosphinic acid, but is preferably a carboxylic acid. The acid can be aliphatic, aromatic, araliphatic or cycloaliphatic; it can be linear or branched; it can be substituted by hydroxyl or alkoxy groups; it can be saturated or unsaturated and it preferably contains 1 to 24 carbon atoms.

Examples of carboxylic acids of this type are formic, acetic, propionic, butyric, isobutyric, caprioic, 2-ethylcaproic, caprylic, capric, lauric, palmitic, stearic, behenic, oleic, lactic, ricinoleic, 2-ethoxypropionic, benzoic, salicylic, 4-butylbenzoic, toluic, 4-dodecylbenzoic, phenylacetic, naphthylacetic, cyclohexanecarboxylic, 4-butylcyclohexanecarboxylic or cyclohexylacetic acid. The carboxylic acid can also be a technical mixture of carboxylic acids, for example technical mixtures of fatty acids or mixtures of alkylated benzoic acids.

Examples of organic acids containing sulfur or phosphorus are methanesulfonic, ethanesulfonic, α,α-dimethylethanesulfonic, n-butanesulfonic, n-dodecanesulfonic, benzenesulfonic, toluenesulfonic, 4-nonylbenzenesulfonic, 4-dodecylbenzenesulfonic or cyclohexanesulfonic acid, dodecanesulfinic, benzenesulfinic or naphthalenesulfinic acid, butylphosphonic acid, phenylphosphonic acid, monomethyl or monoethyl phenylphosphonate, monobutyl benzylphosphonate, dibutylphosphinic acid or diphenylphosphinic acid.

If L is an enolate anion, it is preferably an anion of a β-dicarbonyl compound or of an o-acylphenol. Examples of β-dicarbonyl compounds are acetylacetone, benzoylacetone, dibenzoylmethane, ethyl acetoacetate, butyl acetoacetate, lauryl acetoacetate or α-acetylcyclohexanone. Examples of o-acylphenols are 2-acetylphenol, 2-butyroylphenol, 2-acetyl-1-naphthol, 2-benzoylphenol or salicylaldehyde. The enolate is preferably the anion of a β-dicarbonyl compound having 5 to 20 carbon atoms.

Organic salts of zinc or magnesium are preferably an acetylacetonate or an aliphatic monocarboxylate having, for example, 1 to 24 carbon atoms. Magnesium acetate, laurate and stearate, zinc formate, acetate, oenanthate, laurate and stearate as well as zinc acetylacetonate and magnesium acetylacetonate are some of the particular preferred examples.

Zinc stearate, magnesium stearate, zinc acetylacetonate, magnesium acetylacetonate, zinc acetate and magnesium acetate are of special interest.

The inorganic salt of zinc or magnesium is for example a carbonate containing compound such as Zn-hydroxide-carbonate, Mg-hydroxide-carbonate, dolomite, e.g a Ca/Mg carbonate such as Microdol Super (RTM) from Micro Minerals (RTM); or a natural or synthetic hydrotalcite.

The natural hydrotalcite is held to possess a structure $Mg_6Al_2(OH)_{16}CO_3.4H_2O$. A typical empirical formula of a synthetic hydrotalcite is

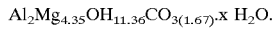

Examples of the synthetic product include:

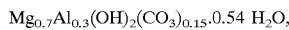

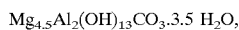

or

Preferred synthetic hydrotalcites are L-55R II (RTM) from REHEIS (RTM) as well as ZHT-4A (RTM) and DHT-4A (RTM) from Kyowa Chemical Industry Co (RTM).

Component (XXX) can also be a mixture of two different Mg- and/or Zn-compounds, for example Mg-stearate and hydrotalcite (DHT-4A (RTM)),
Zn-stearate and hydrotalcite (DHT-4A (RTM)),
Mg-acetylacetonate and hydrotalcite (DHT-4A (RTM)),
Mg-oxide and hydrotalcite (DHT-4A (RTM)),
Mg-hydroxide and hydrotalcite (DHT-4A (RTM)),
Zn-hydroxide-carbonate and Mg-stearate,
Zn-hydroxide-carbonate and Zn-stearate,
Zn-hydroxide-carbonate and Mg-acetylacetonate,
Zn-hydroxide-carbonate and Mg-oxide,
Zn-hydroxide-carbonate and Zn-oxide,
Zn-hydroxide-carbonate and Mg-hydroxide,
hydrotalcite (REHEIS (RTM)) and Mg-stearate,
hydrotalcite (REHEIS (RTM)) and Zn-stearate,
hydrotalcite (REHEIS (RTM)) and Mg-oxide,
dolomite (Microdol Super (RTM)) and Zn-stearate,
dolomite (Microdol Super (RTM)) and Mg-stearate,
dolomite (Microdol Super (RTM)) and Zn-oxide,
dolomite (Microdol Super (RTM)) and Mg-hydroxide,
Mg-stearate and Zn-stearate,
Mg-stearate and Zn-acetylacetonate,
Mg-stearate and Mg-oxide,
Mg-stearate and Zn-oxide,
Mg-stearate and Mg-hydroxide,
Zn-stearate and Mg-acetate,
Zn-stearate and Mg-oxide,
Zn-stearate and Mg-hydroxide,
Mg-acetylacetonate and Zn-acetylacetonate,
Mg-acetylacetonate and Mg-oxide,
Mg-acetylacetonate and Zn-oxide,
Mg-acetylacetonate and Mg-hydroxide,
Zn-acetylacetonate and Mg-oxide,
Zn-acetylacetonate and Zn-oxide, or
Mg-oxide and Zn-oxide.

In this case, the two different compounds of component (XXX) may be present in a weight ratio of 1:10 to 10:1.

A preferred embodiment of this invention relates to a stabilizer mixture wherein the additional component (XXX) corresponds to one or two different compounds selected from the group consisting of Mg carboxylates, Zn carboxylates, Mg oxides, Zn oxides, Mg hydroxides, Zn hydroxides, Mg carbonates and Zn carbonates.

A particularly preferred embodiment of this invention relates to a stabilizer mixture wherein the additional component (XXX) corresponds to one or two different compounds selected from the group consisting of Mg stearate, Zn stearate, a hydrotalcite, in particular DHT-4A (RTM), or a mixture of Mg stearate and a hydrotalcite.

Polypropylene or polypropylene copolymers prepared by polymerization over a metallocene catalyst, more detailed a transition metallocene catalyst, are commercially available. They are also known under the name "metallocene polypropylene" or "metallocene polypropylene copolymers". Examples of commercially available metallocene polypropylene are METOCENE X 5049 (RTM) and METOCENE X 50212 (RTM).

Catalyst systems based on a transition metallocene complex have made it possible to prepare either polymers with a particularly narrow molecular weight distribution or (co) polymers with a particular structure. These systems can be either homogeneous catalyst systems or supported catalysts. More details on the possible catalyst systems can be found, for example, in EP-A-563,917, EP-A-578,838, U.S. Pat. Nos. 4,659,685, 5,240,894 and WO-A-92/333.

Some representative explanations directed to the metallocene catalysts and the polypropylene or polypropylene copolymers prepared by polymerization over those catalysts are given in the following.

The olefins which can be polymerized over a metallocene catalyst are for example propylene or also mixtures of olefins, for example ethylene-propylene or propylene mixed with minor amounts of higher α-olefins. In this case preference is given to $C_2$- and $C_3$-olefin copolymers.

The transition metallocene catalysts are, for example, compounds of the formula (A*)

$$\{[(R_1)(R_2M)_a]^{an+}an/q[LQ_m]^{q-}\} \tag{A*}$$

in which a is 1 or 2 and n and q independently of one another are each an integer from 1 to 4, M is the cation of a monovalent to tetravalent metal from group IVb to VIIb, VIII or Ib of the Periodic Table of the Elements, m is an integer corresponding to the valency of L+q, Q is a halogen atom, L is a divalent to heptavalent metal or nonmetal, $R_1$ is a π-arene and $R_2$ is a π-arene or the anion of a π-arene. Particularly suitable π-arenes $R_1$ and $R_2$ are aromatic groups having 6 to 24 carbon atoms or heteroaromatic groups having 3 to 30 carbon atoms, it being possible for these groups to be substituted one or more times by identical or different monovalent radicals, such as halogen atoms, preferably chlorine or bromine atoms, or $C_1$–$C_8$alkyl, $C_1$–$C_8$alkoxy, cyano, $C_1$–$C_8$alkylthio, $C_2$–$C_6$monocarboxylic acid alkyl ester, phenyl, $C_2$–$C_5$alkanoyl or benzoyl groups. These π-arene groups can be monocyclic, fused polycyclic or unfused polycyclic systems, where in the latter systems the rings can be linked directly or via bridging members such as —S— or —O—. $R_2$ as the anion of a π-arene can be an anion of a π-arene of the abovementioned type, for example the indenyl anion and, in particular, the cyclopentadienyl anion, it being possible for these anions too to be substituted one or more times by identical or different monovalent radicals such as $C_1$–$C_8$alkyl, $C_2$–$C_6$monocarboxylic acid alkyl ester, cyano, $C_2$–$C_5$alkanoyl or benzoyl groups.

The alkyl, alkoxy, alkylthio, monocarboxylic acid alkyl ester and alkanoyl substituents can be straight-chain or branched. Typical alkyl, alkoxy, alkylthio, monocarboxylic acid alkyl ester and alkanoyl substituents are methyl, ethyl, n-propyl, isopropyl, n-butyl, sec-butyl, tert-butyl, n-pentyl, n-hexyl and n-octyl, methoxy, ethoxy, n-propoxy, isopropoxy, n-butoxy, n-hexyloxy and n-octyloxy, methylthio, ethylthio, n-propylthio, isopropylthio, n-butylthio, n-pentylthio and n-hexylthio, carboxylic acid methyl, ethyl, n-propyl, isopropyl, n-butyl and n-pentyl ester, and acetyl, propionyl, butyryl and valeroyl. Among these, preference is given to alkyl, alkoxy, alkylthio and monocarboxylic acid alkyl ester groups having 1 to 4 carbon atoms, in particular 1 or 2 carbon atoms, in the alkyl moieties, and to alkanoyl groups having 2 or 3 carbon atoms. Preferred substituted π-arenes or anions of substituted π-arenes are those containing one or two of the abovementioned substituents, especially chlorine or bromine atoms, methyl, ethyl, methoxy, ethoxy, cyano, carboxylic acid methyl or ethyl ester groups and acetyl groups.

The π-arenes $R_1$ and $R_2$ can be identical or different. Suitable heteroaromatic π-arenes are systems containing S, N and/or O atoms. Heteroaromatic α-arenes containing S and/or O atoms are preferred.

Examples of suitable π-arenes are benzene, toluene, xylenes, ethylbenzene, methoxybenzene, ethoxybenzene, dimethoxybenzene, p-chlorotoluene, chlorobenzene, bromobenzene, dichlorobenzene, acetylbenzene, trimethylbenzene, trimethoxybenzene, naphthalene, 1,2-dihydronaphthalene, 1,2,3,4-tetrahydronaphthalene, methylnaphthalenes, methoxynaphthalenes, ethoxynaphthalenes, chloronaphthalenes, bromonaphthalenes, biphenyl, indene, biphenylene, fluorene, phenanthrene, anthracene, 9,10-dihydroanthracene, triphenylene, pyrene, naphthacene, coronene, thiophene, chromene, xanthene, thioxanthene, benzothiophene, naphthothiophene, thianthrene, diphenylene oxide, diphenylene sulfide, acridine and carbazole.

If a is 2, $R_2$ is preferably in each case the anion of a π-arene and M is in each case the same metal atom.

Examples of anions of substituted π-arenes are the anions of methyl-, ethyl-, n-propyl- and n-butylcyclopentadiene, the anions of dimethylcyclopentadiene, of cyclopentadienecarboxylic acid methyl and ethyl ester, and also of acetylcyclopentadiene, propionylcyclopentadiene, cyanocyclopentadiene and benzoylcyclopentadiene. Preferred anions are the anion of unsubstituted indene and, in particular, that of unsubstituted cyclopentadiene.

Preferably, a is 1, $R_2$ is benzene, toluene, xylene, methoxybenzene, chlorobenzene, p-chlorotoluene, naphthalene, methylnaphthalene, chloronaphthalene, methoxynaphthalene, biphenyl, indene, pyrene or diphenylene sulfide and $R_2$ is the anion of cyclopentadiene, acetylcyclopentadiene or indene or is benzene, toluene, xylene, trimethylbenzene, naphthalene or methylnaphthalene.

Particularly preferred complexes of the formula (A*) are those in which a is 1, $R_1$ is $\eta^6$-pyrene or $\eta^6$-naphthalene and $R_2$ is the anion of $\eta^5$-cyclopentadiene, n is preferably 1 or 2, in particular 1, and q is preferably 1. M is for example $Ti^{2+}$, $Ri^{3+}$, $Ti^{4+}$, $Zr^+$, $Zr^{2+}$, $Zr^{3+}$, $Zr^{4+}$, $Hf^+$, $Hf^{2+}$, $Hf^{3+}$, $Hf^{4+}$, $Nb^+$, $Nb^{2+}$, $Nb^{3+}$, $Cr^+$, $Mo^+$, $Mo^{2+}$, $W^+$, $W^{2+}$, $Mn^+$, $Mn^{2+}$, $Re^+$, $Fe^{2+}$, $Co^{2+}$, $Co^{3+}$, $Ni^{2+}$ or $Cu^{2+}$. M is preferably a titanium, zirconium or hafnium cation, especially a titanium or zirconium cation, and with particular preference is $Ti^{4+}$ or $Zr^{4+}$.

Examples of suitable metals or nonmetals L are Sb, Fe, Sn, Bi, Al, Ga, In, Ti, Zr, Sc, V, Cr, Mn and Cu; lanthanides such as Ce, Pr and Nd or actinides such as Th, Pa, U or Np.

Particularly suitable nonmetals are B, P and As. L is preferably P, As, B or Sb, with P being particularly preferred.

Complex anions $[Lq_m]^{q-}$ are, for example, $BF_4^-$, $PF_6^-$, $AsF_6^-$, $SbF_6^-$, $FeCl_4^-$, $SnCl_6^-$, $SbCl_6^-$ and $BiCl_6^-$. The particularly preferred complex anions are $SbF_6^-$, $BF_4^-$, $AsF_6^-$ and $PF_6^-$.

The compounds of the formula (A*) can be prepared by methods known per se, for example by reacting a compound of the formula (B*)

$$\{[(R_1(R_2M)_a]^{an+}an/q[X]^{q-}\} \tag{B*}$$

with a salt of an anion $$[LQ_m]^{q-}$$

in which a, m, n, q, $R_1$, $R_2$, M and L are as defined under the formula (A*) and $[X]^{q-}$ is an anion which is different from $[LQ_m]^{q-}$.

Both the compounds of the formula (B*) and the compounds of the formula (C*)

$$\{[(R'_1)(R_2M_a]\} \tag{C*}$$

in which a and M are as defined above and $R'_1$ is a π-arene or the anion of a π-arene and $R_2$ is an anion of a π-arene, can be prepared by reacting identical or different π-arenes in the presence of a Lewis acid with a salt of a metal from group IVb to VIIb, VII or Ib of the Periodic Table. The compounds of the formulae (A*), (B*) and (C*) are also suitable for carrying out a ligand exchange, by reacting these compounds in the presence of a Lewis acid with a π-arene which is different from $R_1$ and/or $R_2$, or $R'_1$. In such cases, n is preferably 2 and particularly preferably 1.

Compounds of the formula (A*) in which L is a metal can be prepared by reacting identical or different π-arenes in the presence of a Lewis acid with a suitable salt of a metal from group IVb to VIIb, VII or Ib of the Periodic Table of the Elements, for example a titanium, zirconium, chromium, manganese or, in particular, iron salt. Finally, compounds of the formula (A*) can also be converted in a customary manner, by anion exchange, into complexes of the formula (A*) with a different anion $[LQ_m]^{q-}$.

In a preferred embodiment the starting materials employed are uncharged π-complexes of the formula (C*), for example ferrocene or bis(η⁵-indenyl)iron(II), and these starting materials are converted by ligand exchange into a complex of the formula (B*), which is subsequently reacted with a salt of an anion $[LQ_m]^{q-}$. The complex of the formula (B*) obtained as intermediate in this procedure is normally not isolated.

Examples of suitable salts of anions $[LQ_m]^{q-}$ are alkali metal, alkaline earth metal or ammonium salts. It is preferred to use alkali metal salts, and particularly preferably sodium salts and potassium salts.

Examples of suitable Lewis acids for the reactions described above are $AlCl_3$, $AlBr_3$, $BF_3$, $SnCl_4$ and $TiCl_4$, preferably $AlCl_3$. It can be advantageous to carry out the ligand exchange reaction with the addition of a reducing agent, for example aluminium or magnesium, to the reaction mixture, or to add a reducing agent, for example $Na_2SO_3$ or ascorbic acid, to the reaction mixture subsequently. Aluminium is the preferred reducing agent. The ligand exchange reactions are expediently carried out in an inert organic solvent. Examples of suitable solvents are aliphatic or cycloaliphatic hydrocarbons such as octane, nonane, decane and cyclohexane. If desired, an excess of π-arene can also be employed as solvent.

The reaction of the compounds of the formula (B*) with a salt of an anion $[LQ_m]^{q-}$ and the anion exchange conversion of compounds of the formula (A*) are expediently carried out in an aqueous or aqueous alcoholic medium, for example in mixtures of water and methanol or ethanol. The salts of the anions $[LQ_m]^{q-}$ are employed at least in stoichiometric amounts but preferably in excess.

For the polymerization, it is additionally possible to use a metallocene catalyst consisting of two principal components (A*-1 and A*-2).

Of these, component A*-1 is a metallocene compound. It is possible in principle to employ any metallocene regardless of its structure and composition. The metallocenes can be either bridged or unbridged, and can have identical or different ligands. The compounds involved are those of the metals of groups IVb, Vb or VIb of the Periodic Table, for example compounds of titanium, zirconium, hafnium, vanadium, niobium, tantalum, chromium, molybdenum and tungsten, preferably of zirconium, hafnium and titanium, especially zirconium.

Such metallocenes are known and are described, for example, in the following documents: EP-A-336,127, EP-A-336,128, EP-A-387,690, EP-A-387,691, EP-A-302,424, EP-A-129,368, EP-A-320,762, EP-A-284,707, EP-A-316,155, EP-A-351,392, U.S. Pat. No. 5,017,714, J. Organomet, Chem., 342 (1988) 21.

Metallocenes worthy of emphasis are those of the general structure

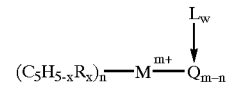

in which $M^{m+}$ is an m-valent cation of a metal of groups IVb, V or VIb of the Periodic Table, for example titanium, zirconium, hafnium, vanadium, niobium, tantalum, chromium, molybdenum or tungsten, preferably zirconium, hafnium or titanium, especially zirconium;

$(C_5H_{5-x}R_x)$ is a cyclopentadienyl ring substituted with from zero to five substituents R;

x is zero, one, two, three, four or five;

n is one or two;

each $R_1$ independently of the others, is a $C_1$–$C_{20}$ hydrocarbon radical, a $C_1$–$C_{20}$ hydrocarbon radical substituted by one or more halogen atoms, a metalloid-substituted $C_1$–$C_{20}$ hydrocarbon radical or halogen; or two adjacent radicals R are a $C_4$–$C_{20}$ ring;

or, if n is 1, alternatively a radical $B_y$—$JR'_{z-1-y}$, in which

J is an element of group Va of the Periodic Table of coordination number 3 or an element of group VIa of the Periodic Table of coordination number 2, preferably N, P, O or S;

each R', independently of the others, is a $C_1$–$C_{20}$ hydrocarbon radical or a $C_1$–$C_{20}$ hydrocarbon radical which is substituted by one or more halogen atoms;

z is the coordination number of the element J;

y is zero or one;

B, if y is one, is a bridging member comprising an element of group IVA or VA of the Periodic Table, for example $C_1$–$C_{20}$alkylene, a $DiC_1$-$C_{20}$alkyl-, $C_7$–$C_{20}$alkylaryl- or $DiC_6$-$C_{20}$arylsilicon or germanium radical or an alkyl- or aryl-phosphine or amine radical;

or R, if n is two, is a group selected from —$M_2(R_{10})$ $(R_{11})$—, —$M_2(R_{10})(R_{11})$—$M_2(R_{10})(R_{11})$— —$C(R_{10})$ $(R_{11})$—$C(R_{10})(R_{11})$—, —O—$M_2(R_{10})(R_{11})$—O—, —$C(R_{10})(R_{11})$—, —O—$M_2(R_{10})(R_{11})$—, —$C(R_{10})$ $(R_{11})$—$M_2(R_{10})(R_{11})$, —$B(R_{10})$—, —$Al(R_{10})$—, —Ge—, —Sn—, —O—, —S—, —S(O)—, —S(O)$_2$—, —$N(R_{10})$—, —C(O)—, —$P(R_{10})$— or —$P(O)$ $(R_{10})$—;

in which $R_{10}$ and $R_{11}$ are identical or different and are a hydrogen atom, a halogen atom, a $C_1$–$C_{10}$alkyl, $C_1$–$C_{10}$fluoroalkyl, $C_6$–$C_{10}$aryl, $C_6$–$C_{10}$fluoroaryl, $C_1$–$C_{10}$alkoxy, $C_2$–$C_{10}$alkenyl, $C_7$–$C_{40}$arylalkyl, $C_8$–$C_{40}$arylalkenyl or $C_7$–$C_{40}$alkylaryl group or $R_{10}$ and $R_{11}$, in each case with the atoms which join them, form a ring, and $M_2$ is silicon, germanium or tin, each Q, independently of the others, is hydrogen, a $C_1$–$C_{50}$ hydrocarbon radical, a $C_1$–$C_{50}$ hydrocarbon radical which is substituted with one or more electron-withdrawing groups, for example halogen or alkoxy, or a metalloid-substituted $C_1$–$C_{50}$ hydrocarbon radical, the metalloid being an element of group IVA of the Periodic Table, with the exception of hydrocarbon radicals of the formula $(C_5H_{5-x}R_x)$; or two radicals Q are alkylidene, olefin, acetylene or a cyclometallated hydrocarbon radical;

L is a neutral Lewis base, for example diethyl ether, tetrahydrofuran, dimethylaniline, aniline, trimethylphosphine or n-butylamine; and w is from 0 to 3.

The term metalloid refers, for example, to the elements silicon, germanium, tin and lead.

In this context, a preferred type of metallocene corresponds to the following structure:

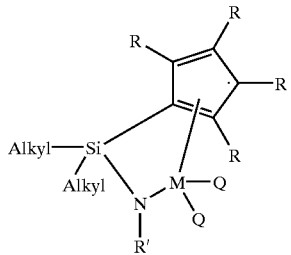

in which M is Ti or Zr and the other substituents are as defined above.

Further details on metallocenes of the above type can also be found in WO-A-92/333.

For the isospecific polymerization of substituted olefins, for example propene, butene and styrene, and their copolymerization, including that with other olefins, the metallocenes which are of interest, especially zirconocenes, are those which carry indenyl derivatives as ligands. These are preferably the compounds of the following formula (1)

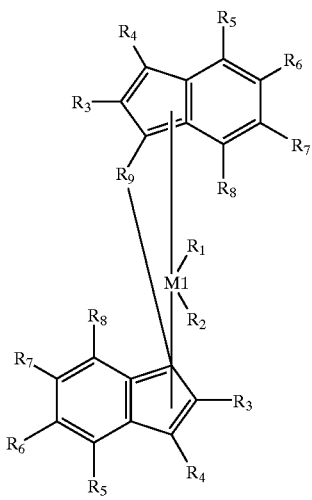

(1)

in which $M_1$ is a metal of group IVb, Vb or VIb of the Periodic Table;

$R_1$ and $R_2$ are identical or different and are a hydrogen atom, a $C_1$–$C_{10}$alkyl, $C_1$–$C_{10}$alkoxy, $C_6$–$C_{10}$aryl, $C_6$–$C_{10}$aryloxy, $C_2$–$C_{10}$alkenyl, $C_7$–$C_{40}$arylalkyl, $C_7$–$C_{40}$alkylaryl, $C_8$–$C_{40}$arylalkenyl or OH group or a halogen atom, and the radicals $R_3$ are identical or different and are a hydrogen atom, a halogen atom, a $C_1$–$C_{10}$alkyl group which can be halogenated, a $C_6$–$C_{10}$aryl group, or a radical —$NR_2$, —SR, —$OSiR_3$, —$SiR_3$ or $PR_2$, in which R is a halogen atom, a $C_1$–$C_{10}$alkyl group or a $C_6$–$C_{10}$aryl group.

$R_4$ to $R_8$ are as defined for $R_3$, or adjacent radicals $R_4$ to $R_8$ form, with the atoms connecting them, an aromatic or aliphatic ring, $R_9$ is a group selected from —$M_2(R_{10})(R_{11})$—, —$M_2(R_{10})(R_{11})$—$M_2(R_{10})(R_{11})$—, —$C(R_{10})(R_{11})$—$C(R_{10})(R_{11})$—, —O—$M_2(R_{10})(R_{11})$—O—, —$C(R_{10})(R_{11})$—, —O—$M_2(R_{10})(R_{11})$—, —$C(R_{10})(R_{11})$—$M_2(R_{10})(R_{11})$—, —$B(R_{10})$—, —$Al(R_{10})$—, —Ge—, —Sn—, —O—, —S—, —S(O)—, —$S(O)_2$—, N—$(R_{10})$—, —C(O)—, —$P(R_{10})$— or —P(O)$(R_{10})$—; in which $R_{10}$ and $R_{11}$ are identical or different and are a hydrogen atom, a halogen atom, a $C_1$–$C_{10}$alkyl, $C_1$–$C_{10}$fluoroalkyl, $C_6$–$C_{10}$aryl, $C_6$–$C_{10}$fluoroaryl, $C_1$–$C_{10}$alkoxy, $C_2$–$C_{10}$alkenyl, $C_7$–$C_{40}$arylalkyl, $C_8$–$C_{40}$arylalkenyl or $C_7$–$C_{40}$alkylaryl group or $R_{10}$ and $R_{11}$, in each case with the atoms connecting them, form a ring, and $M_2$ is silicon, germanium or tin.

The 4,5,6,7-tetrahydroindenyl analogues corresponding to the compounds of the formula (1) are also of importance. Preferably, in formula (1), $M_1$ is zirconium, $R_1$ and $R_2$ are identical and are methyl or chlorine, especially chlorine, $R_3$ to $R_8$ are hydrogen or $C_1$–$C_4$alkyl, $R_9$ is —$Si(R_{10})(R_{11})$—, —$C(R_{10})(R_{11})$— or —$C(R_{10})(R_{11})$—$C(R_1)(R_{11})$— and $R_{10}$ and $R_{11}$ are identical or different and are $C_1$–$C_4$alkyl or $C_6$–$C_{10}$aryl. In particular, $R_{10}$ and $R_{11}$ are identical or different and are methyl or phenyl.

The indenyl and/or tetrahydroindenyl ligands in formula (1) are preferably substituted in the 2, 2, 4, 4, 7, 2, 6, 2, 4, 6, 2, 5, 6, 2, 4, 5, 6 or 2, 4, 5, 6, 7 positions, in particular in the 2, 4, 6 positions. The substituents are preferably a $C_1$–$C_4$alkyl group such as methyl, ethyl or isopropyl. The 2 position is preferably substituted by methyl.

Also of particular importance are those compounds of the formula (1) in which the substituents in positions 4 and 5 of the indenyl radicals ($R_5$ and $R_6$) form, together with the atoms connecting them, a benzene ring. This fused ring system can likewise be substituted by radicals having the definitions of $R_3$-$R_8$. An example of such compounds I is dimethylsilanediylbis(2-methyl-4,5-benzoindenyl) zirconium dichloride.

The metallocenes of the formula (1) are particularly suitable for the preparation of high molecular weight polyolefins of high stereoregularity.

Also of particular importance are compounds of the formula (1) with (substituted) phenyl or naphthyl substituted in position 4.

For the syndiospecific polymerization of substituted olefins, for example propene, butene and styrene, and their copolymerization, including that with other olefins, the metallocenes of interest are those of the formula (2):

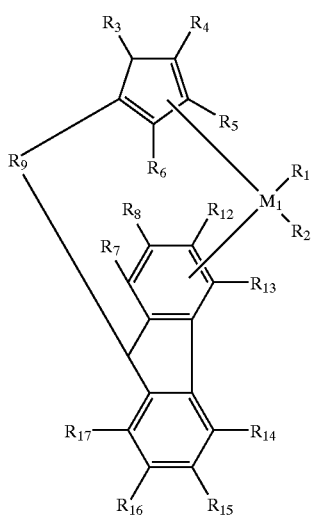

(2)

in which $M_1$ is a metal of group IVb, Vb or VIb of the Periodic Table;

$R_1$ and $R_2$ are identical or different and are a hydrogen atom, a $C_1$–$C_{10}$alkyl, $C_1$–$C_{10}$alkoxy, $C_6$–$C_{10}$aryl, $C_6$–$C_{10}$aryloxy, $C_2$–$C_{10}$alkenyl, $C_7$–$C_{40}$arylalkyl, $C_8$–$C_{40}$arylalkenyl or OH group or a halogen atom, and the radicals $R_3$ are identical or different and are a hydrogen atom, a halogen atom, a $C_1$–$C_{10}$alkyl group which can be halogenated, a $C_6$–$C_{10}$aryl group, or a radical —$NR_2$, —$SR$, —$OSiR_3$, —$SiR_3$ or $PR_2$, in which R is a halogen atom, a $C_1$–$C_{10}$alkyl group or a $C_6$–$C_{10}$aryl group.

$R_4$ to $R_8$ are as defined for $R_3$, or adjacent radicals $R_4$ to $R_8$ form, with the atoms connecting them, an aromatic or aliphatic ring, $R_9$ is a group selected from —$M_2(R_{10})(R_{11})$—, —$M_2(R_{10})(R_{11})$—$M_2(R_{10})(R_{11})$—, —$C(R_{10})(R_{11})$—$C(R_{10})(R_{11})$—, —$O$—$M_2(R_{10})(R_{11})$—$O$—, —$C(R_{10})(R_{11})$—, —$O$—$M_2(R_{10})(R_{11})$—, —$C(R_{10})(R_{11})$—$M_2(R_{10})(R_{11})$—, —$B(R_{10})$—, —$Al(R_{10})$—, —Ge—, —Sn—, —O—, —S—, —S(O)—, —$S(O)_2$—, —$N(R_{10})$—, —C(O)—, —$P(R_{10})$— or —P(O)($R_{10}$)—; in which $R_{10}$ and $R_{11}$ are identical or different and are a hydrogen atom, a halogen atom, a $C_1$–$C_{10}$alkyl, $C_1$–$C_{10}$fluoroalkyl, $C_6$–$C_{10}$aryl, $C_6$–$C_{10}$fluoroaryl, $C_1$–$C_{10}$alkoxy, $C_2$–$C_{10}$alkenyl, $C_7$–$C_{40}$arylalkyl, $C_8$–$C_{40}$arylalkenyl or $C_7$–$C_{40}$alkylaryl group or $R_{10}$ and $R_{11}$, in each case with the atoms connecting them, form a ring, and $M_2$ is silicon, germanium or tin; and $R_{12}$ to $R_{17}$ are as defined for $R_3$.

Examples of metallocenes which can be used for the polymerization are the following compounds: biscyclopentadienylzirconium dichloride, biscyclopentadienylzirconiumdimethyl, biscyclopentadienylzirconiumdiphenyl, biscyclopentadienylzirconiumdibenzyl, biscyclopentadienylzirconiumbistrimethylsilyl, bis(methylcyclopentadienyl)zirconium dichloride, bis(1,2-dimethylcyclopentadienyl)zirconium dichloride, bis(1,3-dimethylcyclopentadienyl)zirconium dichloride, bis(1,2,4-trimethylcyclopentadienyl)zirconium dichloride, bis(1,2,3-trimethylcyclopentadienyl)zirconium dichloride, bis(pentamethylcyclopentadienyl)zirconium dichloride, bisindenylzirconium dichloride, bis(tetrahydroindenyl)zirconium dichloride, dimethylsilylbis-1-tetrahydroindenylzirconium dichloride, dimethylsilylbis-1-(2-methyltetrahydroindenyl)zirconium dichloride, dimethylsilylbis-1-(2,3,5-trimethylcyclopentadienyl)zirconium dichloride, dimethylsilylbis-1-(2,4-dimethylcyclopentadienyl)zirconium dichloride, dimethylsilylbis-1-indenylzirconium dichloride, dimethylsilylbis-1-indenylzirconiumdimethyl, dimethylgermylbis-1-indenylzirconium dichloride, dimethylsilylbis-1-(2-methylindenyl)zirconium dichloride, dimethylsilylbis-1-(2-methyl-4-isopropylindenyl)zirconium dichloride, phenylmethylsilylbis-1-(2-methylindenyl)-zirconium dichloride, dimethylsilylbis-1-(2-methyl-4-ethylindenyl)zirconium dichloride, ethylenebis-1-(4,7-dimethylindenyl)zirconium dichloride, phenyl(methyl)silylbis-1-indenyl-zirconium dichloride, phenyl(vinyl)silylbis-1-indenylzirconium dichloride, diphenylsilylbis-1-indenylzirconium dichloride, dimethylsilylbis(1-(2-methyl-4-tert-butylindenyl))zirconium dichloride, methylphenylsilylbis(1-(2-methyl-4-isopropylindenyl))zirconium dichloride, dimethylsilylbis(1-(2-ethyl-4-methylindenyl))zirconium dichloride, dimethylsilylbis(1-(2,4-dimethylindenyl))zirconium dichloride, dimethylsilylbis(1-(2-methyl-4-ethylindenyl))-zirconium dichloride, dimethylsilylbis(2-methyl-4,6-diisopropylindenyl)zirconium di-chloride, dimethylsilylbis(2,4,6-trimethylindenyl)zirconium dichloride, methylphenylsilylbis(2-methyl-4,6-diisopropylindenyl)zirconium dichloride, 1,2-ethanediylbis(2-methyl-4,6-diisopropylindenyl)zirconium dichloride, dimethylsilyl(9-fluorenyl)(cyclopentadienyl)-zirconium dichloride, diphenylsilyl(9-fluorenyl)(cyclopentadienyl)zirconium dichloride, diphenylmethylene(9-fluorenyl)cyclopentadienylzirconium dichloride, isopropylidene(9-fluorenyl)cyclopentadienylzirconium dichloride, phenylmethylmethylene(9-fluorenyl)cyclopentadienylzirconium dichloride, isopropylidene(9-fluorenyl)(1-(3-isopropyl)cyclopentadienyl)zirconium dichloride, isopropylidene(9-fluorenyl)(1-(3-methyl)cyclopentadienyl)zirconium dichloride, diphenylmethylene(9-fluorenyl)(1-(3-methyl)cyclopentadienyl)zirconium dichloride, methylphenylmethylene(9-fluorenyl)(1-(3-methyl)cyclopentadienyl)zirconium dichloride, dimethylsilyl(9-fluorenyl)-(1-(3-methyl)cyclopentadienyl)zirconium dichloride, diphenylsilyl(9-fluorenyl)-(1-(3-methyl)cyclopentadienyl)zirconium dichloride, diphenylmethylene(9-fluorenyl)(1-(3-tert-butyl)cyclopentadienyl)zirconium dichloride and isopropylidene(9-fluorenyl)(1-(3-tert-butyl)cyclopentadienyl)zirconium dichloride.

In the preparation of the catalyst, chiral metallocenes are preferably employed as a racemate. However, it is also possible to use the pure R or S form. Using these pure stereoisomeric forms, optically active polymer can be prepared. However, the meso form of the metallocenes should be separated off, since the polymerization-active centre (the metal atom) in these compounds is no longer chiral, owing to mirror symmetry at the central metal, and is therefore unable to produce highly tactic polymer. If the meso form is not separated off, atactic polymer is produced in addition to isotactic or syndiotactic polymers. For certain applications, for example flexible mouldings, or for the preparation of polyethylene grades, this may be entirely desirable. The stereoisomers are separated by methods known from the literature.

As component A*-2, examples of suitable compounds are the following.

a) Aluminoxanes

The aluminoxane used is preferably a compound of the formula (3)

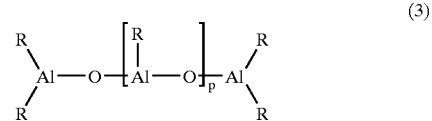

(3)

for the linear type and/or of the formula (4)

(4)

for the cyclic type, in which formulae (3) and (4) the radicals R can be identical or different and are a $C_1$–$C_6$alkyl group, a $C_6$–$C_{18}$aryl group, benzyl or hydrogen, and p is an integer from 2 to 50, preferably from 10 to 35.

The radicals R are preferably identical and are methyl, isobutyl, n-butyl, phenyl or benzyl, particularly preferably methyl.

Where the radicals R are different, they are preferably methyl and hydrogen, methyl and isobutyl or methyl and n-butyl, with the content of hydrogen or isobutyl or n-butyl preferably being 0.01–40% (number of radicals R).

The aluminoxane can be prepared by known methods in various ways. One of the methods, for example, is the reaction of an aluminium hydrocarbon compound and/or a hydridoaluminium-hydrocarbon compound with water (in gaseous, solid or liquid form or else in bound form, for example as water of crystallization) in an inert solvent (for example toluene). To prepare an aluminoxane with different alkyl groups R, two different aluminium trialkyls ($AlR_3$+ $AlR'_3$), in accordance with the desired composition and reactivity, are reacted with water (cf. S. Pasynkiewicz, Polyhedron 9 (1990) 429 and EP-A-302,424).

The precise structure of the aluminoxanes of the formulae (3) and (4) is unknown.

Regardless of the manner of their preparation, all aluminoxane solutions share the feature of a varying content of unreacted aluminium starting compound, which is present in free form or as an adduct.

b) Ion Exchange Compounds

Ion exchange compounds are compounds comprising a cation, which reacts irreversibly with a ligand of component A*-1, and a noncoordinating anion, which is bulky, labile and chemically inert. Combining components A*-1 and A*-2 produces an ion pair formed from the cation of A*-2 and a ligand of A*-1. Examples of cations of component A*-2 are Brønsted acids, such as ammonium ions, or reducible Lewis acids, such as $Ag^+$ or ferrocene ions.

The aluminoxane which can be used as component A*-2 can also be produced in the course of the preparation of a supported catalyst from trimethylaluminium.

In addition to homogeneous catalyst systems, the metallocenes can also be used as heterogeneous catalysts. In this case the catalyst is applied to an inorganic or organic carrier by methods known to the person skilled in the art from the literature. Inorganic carrier materials are preferably silica gels; further details on this can be found, for example, in U.S. Pat. No. 5,240,894.

Examples of organic carrier materials are microporous polymeric carriers which are obtainable commercially (e.g. the ®Accurel grades from AKZO, such as ®Accurel-PE, ®Accurel-PP, ®Accurel-PA-6 or ®Accurel-PA-12 with a voids content of about 75% by volume). The pore size of the ®Accurel materials is 0.5–5 µm (PP), 1.0–5 µm (HDPE), or 0.5–3 µm (PA-6 and PA-12).

The microporous polymeric carrier is advantageously dried beforehand, for example by treatment with aluminium alkyl solutions, then washed and rendered inert under a protective gas.

The preferred procedure for this is first to react the aluminoxane in an appropriate solvent, for example pentane, hexane, heptane, toluene or dichloromethane, with at least one metallocene, by intensive mixing, for example by stirring. The reaction temperature is preferably from –20 to +120° C., in particular 15–40° C. The molar ratio of aluminium to transition metal M of the metallocene is preferably between 10:1 and 10,000:1, in particular between 100:1 and 2000:1. The reaction time is in general between 5 and 120 minutes, preferably 10–30 minutes. The reaction is preferably operated with an aluminium concentration of more than 0.01 mol/liter, in particular more than 0.5 mol/liter. The reaction is carried out under inert conditions.

In place of the aluminoxane it is also possible to use a mixture of an aluminoxane with a further aluminium alkyl compound, for example trimethyl-, triethyl- or triisobutylaluminium, for the described reaction with the metallocene.

After the reaction has taken place it is possible, for example, to remove part of the solvent under vacuum or, following concentration, to replace the solvent by a different solvent. The solution thus prepared is reacted in a suitable manner with the microporous polymeric carrier. In this context, the carrier is added at least in an amount whose total pore volume is able to take up the solution from the previous reaction. The reaction referred to in the second sentence of this paragraph is preferably carried out at temperatures of between –20 and +20° C., in particular 15–40° C., by intense mixing, for example by stirring or treatment with ultrasound. Thorough homogenization should be accomplished. In this context, the exchange of the inert gas of the pore volume can be accelerated by brief evacuation, for example.

In principle, the supported catalyst can also be prepared in a one-pot reaction, i.e. all three starting components are reacted with one another simultaneously in an appropriate solvent/suspension medium. In this context, the amount of the polymeric carrier should preferably be calculated such that it is able to take up the entire volume of liquid.

The catalyst can be metered into the polymerization system in suspended form, in an inert suspension medium such as, for example, heptane, n-decane, hexane or diesel oil, or else in dry form, possibly after removal of the remaining solvent by a drying step carried out, for example, under vacuum.

The catalyst can advantageously be prepolymerized in the gaseous phase, in the liquid monomer or in suspension in which case it is possible to omit the addition of a further organoaluminium compound.

Polymerization with these catalysts can be carried out by known methods in liquid or gaseous phase. The liquid phase may, for example, be an aliphatic hydrocarbon or the liquid monomer itself. The metallocene catalysts can also be employed as a mixture with other types of catalyst, for example Ziegler or Phillips catalysts. At the end of the polymerization the catalyst is destroyed, for example by adding water (vapour), wet nitrogen, carbon dioxide or alcohol.

Metallocene polyolefins are further described in "New Trends in Polyolefin Catalysts and Influence on Polymer Stability" (Rolf Mülhaupt; the Twelfth Annual International Conference on Advances in the Stabilization and Controlled Degradation of Polymers, held in Luzern, Switzerland, May 21-23, 1990, pages 181 to 196 of the conference papers).

A further preferred embodiment of the present invention relates to a composition which additionally contains a polyolefin not prepared by polymerization over a metallocene catalyst.

Such polyolefins are for example prepared
a) by radical polymerization (normally under high pressure and at elevated temperature); or
b) by catalytic polymerization over a Phillips or Ziegler (-Natta) catalyst.

Low density polyethylene (LDPE; prepared by radical polymerization), linear low density polyethylene (LLDPE; prepared by catalytic polymerization over a Ziegler (-Natta) catalyst), polypropylene (PP; prepared by catalytic polymerization over a Ziegler (-Natta) catalyst), and high density polyethylene (HDPE; prepared by catalytic polymerization over a Phillips catalyst) are particularly preferred.

The weight ratio between the polypropylene or polypropylene copolymer prepared by polymerization over a metallocene catalyst to the polyolefin not prepared by polymerization over a metallocene catalyst is for example 1:10 to 10:1.

A further embodiment of this invention is a method for stabilizing polypropylene prepared by polymerization over a metallocene catalyst or a polypropylene copolymer prepared by polymerization over a metallocene catalyst, which comprises incorporating into the polypropylene or polypropylene copolymer a stabilizer mixture as defined above.

The components (A), (B) and optionally (X-1) and/or (X-2), as well as optionally component (XX) and/or (XXX) may be added to the material to be stabilized either individually or mixed with one another.

The total amount of components (A) and (B) in the material to be stabilized is preferably 0.005 to 5%, in particular 0.01 to 1% or 0.05 to 1%, relative to the weight of said material.

The pigment (component (X-1)) is optionally present in the material to be stabilized in an amount of preferably 0.01 to 20%, in particular 0.05 to 1%, relative to the weight of said material.

The UV absorber (component (X-2)) is optionally present in the material to be stabilized in an amount of preferably 0.01 to 1%, in particular 0.05 to 0.5%, relative to the weight of said material.

The total amount of component (X-3) (the pigment in combination with the UV absorber) is preferably 0.01 to 20%, relative to the weight of the material to be stabilized. The weight ratio of the UV absorber to the pigment is for example 2:1 to 1:10.

When the pigment used is titanium dioxide in combination with an organic pigment as described above, titanium dioxide is preferably present in the material to be stablized in an amount of 0.01 to 20% or 0.01 to 10%, relative to the weight of said material, and the organic pigment may be present in an amount of, for example, 0.01 to 2%, relative to the weight of said material.

The Ca compound (component (XX)) is optionally present in the material to be stabilized in an amount of e.g. 0.005 to 1%, preferably 0.05 to 0.2%.

Component (XXX) is optionally present in the material to be stabilized in an amount of e.g. 0.005 to 1%, in particular 0.05 to 0.2%, relative to the weight of said material.

The weight ratio of the two components (A) and (B) is for example 1:10 to 20:1, preferably 1:5 to 5:1, in particular 1:2 to 2:1.

The weight ratio of the components (A):(X-1) is for example 1:100 to 10:1, preferably 1:5 to 5:1, in particular 1:2 to 2:1.

The weight ratio of the components (A):(X-2) is for example 1:5 to 5:1, preferably 1:2 to 2:1.

The weight ratio of the components (A):(X-3) is for example 1:100 to 10:1, preferably 1:5 to 5:1, in particular 1:2 to 2:1.

The weight ratio of the components (A):(XX) is for example 1:10 to 100:1, preferably 1:5 to 5:1, in particular 1:2 to 2:1.

The weight ratio of the components (A):(XXX) is for example 1:10 to 20:1, preferably 1:5 to 5:1, in particular 1:2 to 2:1.

The above components can be incorporated into the material to be stabilized by known methods, for example before or during shaping or by applying the dissolved or dispersed compounds to the material, if necessary with subsequent evaporation of the solvent. The components can be added to the material to be stabilized in the form of a powder, granules or a masterbatch, which contains these components in, for example, a concentration of from 2.5 to 25% by weight.

If desired, the components (A), (B) and optionally (X-1) and/or (X-2), as well as optionally component (XX) and/or (XXX) can be melt blended with each other before incorporation in the material to be stabilized. They can be added to a polymer before or during the polymerization or before the crosslinking.

The materials stabilized according to this invention can be used in a wide variety of forms, for example as films, fibres, tapes, moulding compositions, profiles or as binders for paints, adhesives or putties.

Examples of processing or transformation of the plastics according to the present invention are:

Injection blow molding, extrusion, blow molding, rotomolding, in mold decoration (back injection), slush molding, injection molding, co-injection molding, forming, compression molding, pressing, film extrusion (cast film; blown film), fiber spinning (woven, non-woven), drawing (uniaxial, biaxial), annealing, deep drawing, calandering, mechanical transformation, sintering, coextrusion, coating, lamination, crosslinking (radiation, peroxide, silane), vapor deposition, weld together, glue, vulkanization, thermoforming, pipe extrusion, profile extrusion, sheet extrusion; sheet casting, spin coating, strapping, foaming, recycling/rework, extrusion coating, visbreaking (peroxide, thermal), fiber melt blown, spun bonded, surface treatment (corona discharge, flame, plasma), sterilization (by gamma rays, electron beams), cast polymerization (R&M process, RAM extrusion), gel-coating, tape extrusion, GMT-process, SMC-process, plastisol, and dipping (PVC, latex).

The plastics according to the present invention may be used for the preparation of:

I-1) Floating devices, marine applications, pontoons, buoys, plastic lumber for decks, piers, boats, kayaks, oars, and beach reinforcements.

I-2) Automotive applications, in particular bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side mouldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof.

I-3) Road traffic devices, in particular sign postings, posts for road marking, car accessories, warning triangles, medical cases, helmets, tires.

I-4) Devices for plane, railway, motor car (car, motorbike) including furnishings.

I-5) Devices for space applications, in particular rockets and satellites, e.g. reentry shields.

I-6) Devices for architecture and design, mining applications, acoustic quietized systems, street refuges, and shelters.

II-1) Appliances, cases and coverings in general and electric/electronic devices (personal computer, telephone, handy, printer, television-sets, audio and video devices), flower pots, satellite TV bowl, and panel devices.

II-2) Jacketing for other materials such as steel or textiles.

II-3) Devices for the electronic industry, in particular insulation for plugs, especially computer plugs, cases for electric and electronic parts, printed boards, and materials for electronic data storage such as chips, check cards or credit cards.

II-4) Electric appliances, in particular washing machines, tumblers, ovens (microwave oven), dish-washers, mixers, and irons.

II-5) Covers for lights (e.g. street-lights, lamp-shades).

II-6) Applications in wire and cable (semi-conductor, insulation and cable-jacketing).

II-7) Foils for condensers, refrigerators, heating devices, air conditioners, encapsulating of electronics, semiconductors, coffee machines, and vacuum cleaners.

III-1) Technical articles such as cogwheel (gear), slide fittings, spacers, screws, bolts, handles, and knobs.

III-2) Rotor blades, ventilators and windmill vanes, solar devices, swimming pools, swimming pool covers, pool liners, pond liners, closets, wardrobes, dividing walls, slat walls, folding walls, roofs, shutters (e.g. roller shutters), fittings, connections between pipes, sleeves, and conveyor belts.

III-3) Sanitary articles, in particular shower cubicles, lavatory seats, covers, and sinks.

III-4) Hygienic articles, in particular diapers (babies, adult incontinence), feminine hygiene articles, shower curtains, brushes, mats, tubs, mobile toilets, tooth brushes, and bed pans.

III-5) Pipes (cross-linked or not) for water, waste water and chemicals, pipes for wire and cable protection, pipes for gas, oil and sewage, guttering, down pipes, and drainage systems.

III-6) Profiles of any geometry (window panes) and siding.

III-7) Glass substitutes, in particular extruded plates, glazing for buildings (monolithic, twin or multiwall), aircraft, schools, extruded sheets, window film for architectural glazing, train, transportation, sanitary articles, and greenhouse.

III-8) Plates (walls, cutting board), extrusion-coating (photographic paper, tetrapack and pipe coating), silos, wood substitute, plastic lumber, wood composites, walls, surfaces, furniture, decorative foil, floor coverings (interior and exterior applications), flooring, duck boards, and tiles.

III-9) Intake and outlet manifolds.

III-10) Cement-, concrete-, composite-applications and covers, siding and cladding, hand rails, banisters, kitchen work tops, roofing, roofing sheets, tiles, and tarpaulins.

IV-1) Plates (walls and cutting board), trays, artificial grass, astroturf, artificial covering for stadium rings (athletics), artificial floor for stadium rings (athletics), and tapes.

IV-2) Woven fabrics continuous and staple, fibers (carpets/hygienic articles/geotextiles/monofilaments; filters; wipes/curtains (shades)/medical applications), bulk fibers (applications such as gown/protection clothes), nets, ropes, cables, strings, cords, threads, safety seat-belts, clothes, underwear, gloves; boots; rubber boots, intimate apparel, garments, swimwear, sportswear, umbrellas (parasol, sunshade), parachutes, paraglides, sails, "balloon-silk", camping articles, tents, airbeds, sun beds, bulk bags, and bags.

IV-3) Membranes, insulation, covers and seals for roofs, tunnels, dumps, ponds, dumps, walls roofing membranes, geomembranes, swimming pools, curtains (shades)/sun-shields, awnings, canopies, wallpaper, food packing and wrapping (flexible and solid), medical packaging (flexible & solid), airbags/safety belts, arm- and head rests, carpets, centre console, dashboard, cockpits, door, overhead console module, door trim, headliners, interior lighting, interior mirrors, parcel shelf, rear luggage cover, seats, steering column, steering wheel, textiles, and trunk trim.

V) Films (packaging, dump, laminating, agriculture and horticulture, greenhouse, mulch, tunnel, silage), bale wrap, swimming pools, waste bags, wallpaper, stretch film, raffia, desalination film, batteries, and connectors.

VI-1) Food packing and wrapping (flexible and solid), BOPP, BOPET, bottles.

VI-2) Storage systems such as boxes (crates), luggage, chest, household boxes, pallets, shelves, tracks, screw boxes, packs, and cans.

VI-3) Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices, and packing for pharmaceuticals blister.

VII-1) Extrusion coating (photo paper, tetrapack, pipe coating), household articles of any kind (e.g. appliances, thermos bottle/clothes hanger), fastening systems such as plugs, wire and cable clamps, zippers, closures, locks, and snap-closures.

VII-2) Support devices, articles for the leisure time such as sports and fitness devices, gymnastics mats, ski-boots, inline-skates, skis, big foot, athletic surfaces (e.g. tennis grounds); screw tops, tops and stoppers for bottles, and cans.

VII-3) Furniture in general, foamed articles (cushions, impact absorbers), foams, sponges, dish clothes, mats, garden chairs, stadium seats, tables, couches, toys, building kits (boards/figures/balls), playhouses, slides, and play vehicles.

VI-4) Materials for optical and magnetic data storage.

VII-5) Kitchen ware (eating, drinking, cooking, storing).

VII-6) Boxes for CD's, cassettes and video tapes; DVD electronic articles, office supplies of any kind (ball-point pens, stamps and ink-pads, mouse, shelves, tracks), bottles of any volume and content (drinks, detergents, cosmetics including perfumes), and adhesive tapes.

VII-7) Footwear (shoes/shoe-soles), insoles, spats, adhesives, structural adhesives, food boxes (fruit, vegetables, meat, fish), synthetic paper, labels for bottles, couches, artificial joints (human), printing plates (flexographic), printed circuit boards, and display technologies.

VII-8) Devices of filled polymers (talc, chalk, china clay (kaolin), wollastonite, pigments, carbon black, $TiO_2$, mica, nanocomposites, dolomite, silicates, glass, asbestos).

The stabilized material may additionally also contain various conventional additives, for example:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n- butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tri-cyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis-(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris (3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenol)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)hydrazine.

1.18. Ascorbic acid (vitamin C)

1.19. Aminic antioxidants, for example N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated di-phenylamine, for example p,p'-di-tert-octyldiphenylamine, 4-n-butylaminophenol, 4-butyrylaminophenol, 4-nonanoylamino-phenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, Bis[4-(1',3'-dimethylbutyl) phenyl]amine, tert-octylated N-phenyl-1-naphthylamine, a mixture of mono- and dialkylated tert-butyl/tert-octyldiphenylamine, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-di-hydro-3,3-dimethyl-4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N,N',N'-tetraphenyl-1,4-diamino-but-2-ene, N,N-bis(2,2,6,6-tetramethyl-piperid-4-yl-hexamethylenediamine, bis(2,2,6,6-tetramethylpiperid-4-yl) sebacate, 2,2,6,6-tetramethylpiperidin-4-one, 2,2,6,6-tetramethylpiperidin-4-ol.

2. UV Absorbers and Light Stabilisers

Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl)4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methylphosphite, bis(2,4-di-tert-butyl-6-methylphenyl) ethylphosphite.

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridecyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or tin pyrocatecholate.

10. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers ("ionomers").

11. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

12. Other additives, for example, plasticisers, lubricants, emulsifiers, pigments, rheology additives, catalysts, flow-control agents, optical brighteners, flameproofing agents, antistatic agents, blowing agents and clarifiers.

13. Benzofuranones and indolinones, for example those disclosed in U.S. Pat. Nos. 4,325,863, 4,338,244, 5,175,312, 5,216,052, 5,252,643, DE-A-4316611, DE-A-4316622, DE-A-4316876, EP-A-0589839 or EP-A-0591102 or 3-[4-(2-acetoxyethoxy)phenyl]-5,7-di-tert-butyl-benzofuran-2-one, 5,7-di-tert-butyl-3-[4-(2-stearoyloxyethoxy)phenyl] benzofuran-2-one, 3,3'-bis[5,7-di-tert-butyl-3-(4-[-2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one.

The weight ratio of the total amount of components (A), (B) and optionally (X-1) and/or (X-2), as well as optionally component (XX) and/or (XXX) to the total amount of the conventional additives can be, for example, 100:1 to 1:100.

The example below illustrates the invention in greater detail. All percentages and parts are by weight, unless stated otherwise.

Stabilizers used in the following EXAMPLE I:

Compound (A-l-1-a):
(CHIMASSORB 944 (RTM))

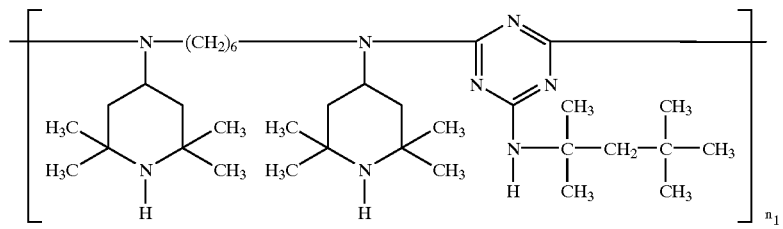

with $n_1$ being 4.5 (mean degree of polymerization).

Compound (B-l-2-a):
(TINUVIN 770 (RTM))

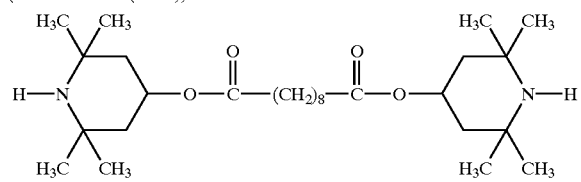

Compound (X-2-a):
(TINUVIN 326 (RTM))

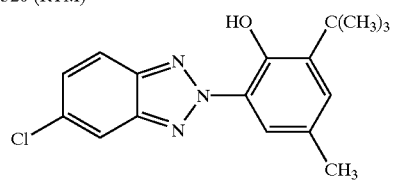

EXAMPLE I

Light Stabilization of Metallocene Polypropylene Films 100 parts of unstabilized metallocene polypropylene powder are homogenized at 200° C. for 10 minutes in a Brabender plastograph with 0.05 parts of pentaerythrityl tetrakis{3-(3,5-di-tert-butyl-4-hydroxyphenyl)propionate}, 0.10 part of tris(2,4-di-tert-butylphenyl)phosphite, 0.10 part of Ca stearate and the amount of the stabilizer system indicated in Table 1. The material thus obtained is compression molded in a laboratory press between two aluminum foils for 6 minutes at 260° C. to a 0.5 mm thick film which is immediately cooled to room temperature in a water-cooled press. Samples of 60 mm×25 mm are cut out of these 0.5 mm films and are exposed in a ®WEATHER-OMETER Ci 65 (black panel temperature 63±2° C., without water-spraying).

Periodically, these samples are removed from the exposure apparatus and their carbonyl content is measured with an infrared spectrophotometer. The exposure time ($T_{0.1}$) corresponding to the formation of a carbonyl absorbance of 0.1 is a measure for the efficiency of the stabilizer system. The values obtained are summarized in the following Table 1.

TABLE 1

| Stabilizer mixture | $T_{0.1}$ in hours |
| --- | --- |
| — | 250 |
| 0.05% of the compound (A-I-1-a) and | 2600 |

TABLE 1-continued

| Stabilizer mixture | $T_{0.1}$ in hours |
| --- | --- |
| 0.05% of the compound (B-I-2-a) and 0.1% of the compound (X-2-a) | |

EXAMPLE II

Light Stabilization of Metallocene Polypropylene Homopolymer Films 100 parts of unstabilized metallocene polypropylene powder (Melt flow index: 19–20 g/10 min. at 230° C. and 2160 g) are homogenized at 200° C. for 10 minutes in a Brabender plastograph with 0.05 parts of pentaerythrityl-tetrakis{3-(3,5-di-tert-butyl-4-hydroxyphenyl)propionate}, 0.05 parts of tris{2,4-di-tert-butylphenyl}phosphite, 0.1 parts of Ca stearate and the stabilizer system indicated in Table 2. The material thus obtained is compression molded in a laboratory press between two aluminum foils for 6 minutes at 260° C. to a 0.45 mm thick film which is cooled immediately to room temperature in a water-cooled press. Samples of 60 mm×25 mm are cut out of these 0.45 mm films and are exposed in a WEATHER-OMETER Ci 65 (black panel temperature 63±2° C., without water-spraying).

Periodically, these samples are removed from the exposure apparatus and their carbonyl content is measured with an infrared spectrophotometer.

The exposure time corresponding to the formation of a carbonyl absorbance of 0.1 ($T_{0.1}$) is a measure for the efficiency of the stabilizer mixture. The values obtained are summarized in the following table.

TABLE 2

| Stabilizer mixture | $T_{0.1}$ in hours |
|---|---|
| 0.025% of the compound (A-I-1-a) and 0.025% of the compound (B-I-2-a) | 1650 |
| 0.05% of the compound (A-I-1-a) and 0.05% of the compound (B-I-2-a) | 2990 |
| 0.10% of the compound (A-I-1-a) and 0.10% of the compound (B-I-2-a) | >9500 |

What is claimed is:

1. A composition containing polyproylene prepared by polymerization over a metallocene catalyst or a polypropylene copolymer prepared by polymerization over a metallocene catalyst, and a stabilizer mixture comprising
   (A) a compound of the formula (A-I-1), (A-I-2), (A-I-3) or (A-I-4), or a product (A-II-a) or a compound of the formula (A-III-1);

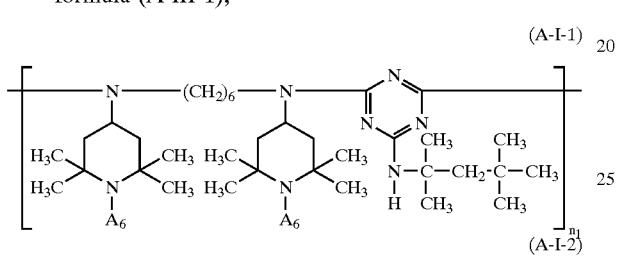
(A-I-1)

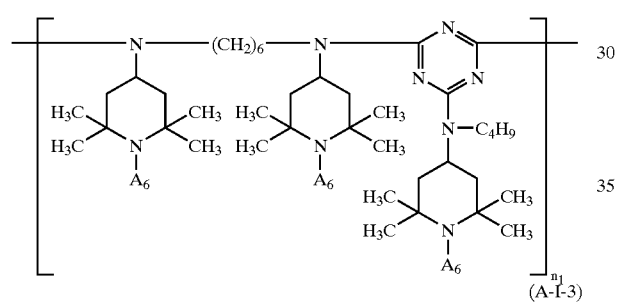
(A-I-2)

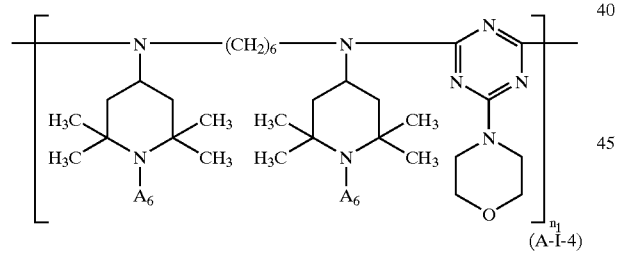
(A-I-3)

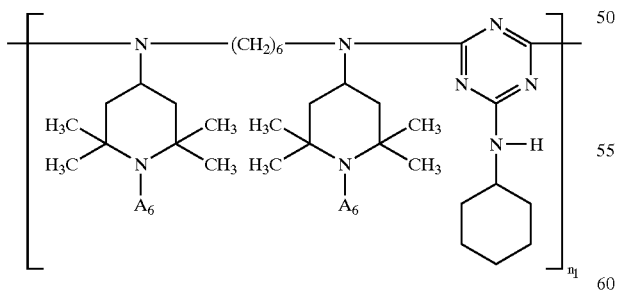
(A-I-4)

wherein $A^6$ as hydrogen, $C_1$–$C_4$alkyl or $C_1$–$C_8$alkoxy and $n_1$ is a number from 2 to 25;

a product (A-II-a) obtainable by reacting a product, obtained by reaction of a polyamine of the formula (A-II-1-a) with cyanuric chloride, with a compound of the formula (A-II-2-a)

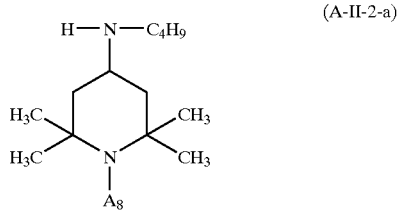
(A-II-1-a)
(A-II-2-a)

wherein $A_8$ as hydrogen $C_1$–$C_4$alkyl or $C_1$–$C_8$alkoxy;

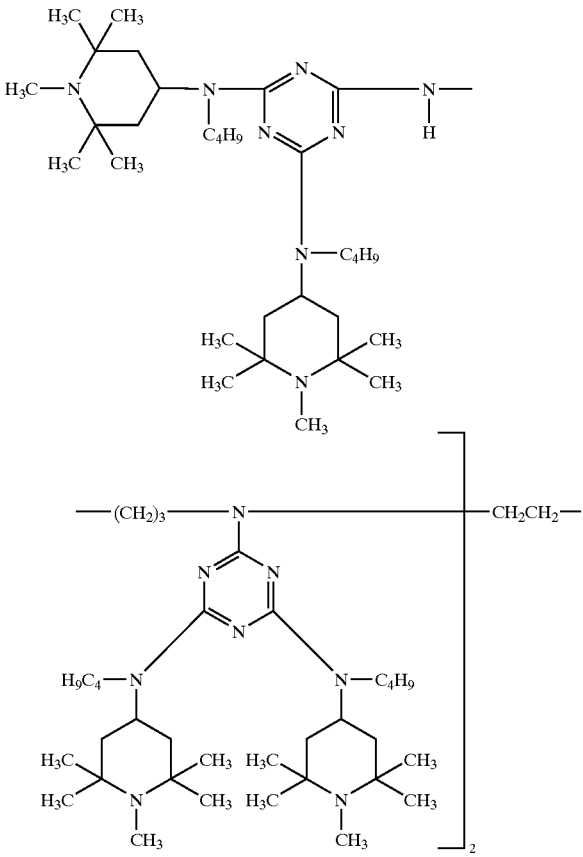

and

B) a compound of the formula (B-I-2),

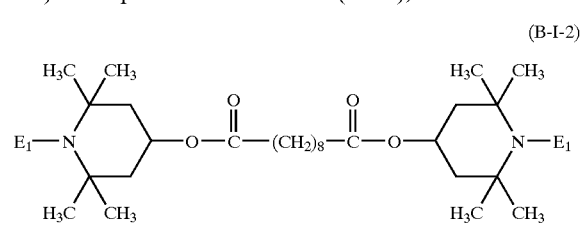
(B-I-2)

wherein $E_1$ is hydrogen, $C_1$–$C_4$alkyl, $C_1$–$C_4$alkoxy or $C_1$–$C_4$alkoxy substituted by —OH.

2. A composition according to claim 1 wherein component (A) corresponds to the compound of the formula (A-I-1-a)

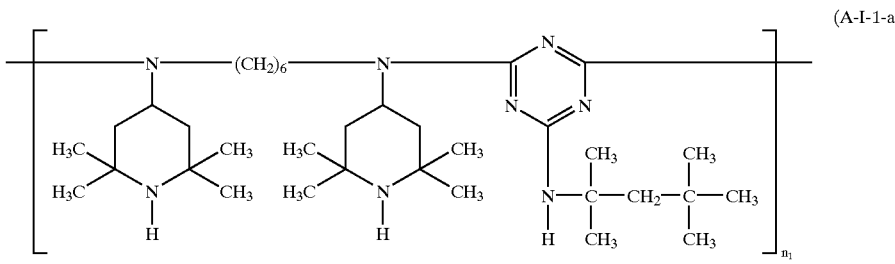

wherein $n_1$ is a number from 2 to 20; and
component (B) corresponds to the compound of the formula (B-I-2-a);

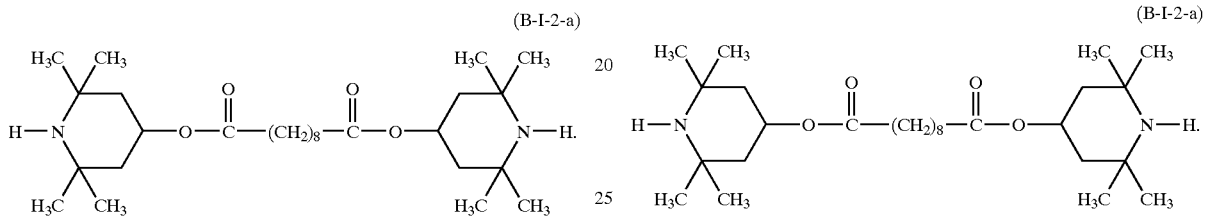

3. A composition according to claim 1 wherein component (A) corresponds to the compound of the formula (A-I-2-a) or (A-III-1)

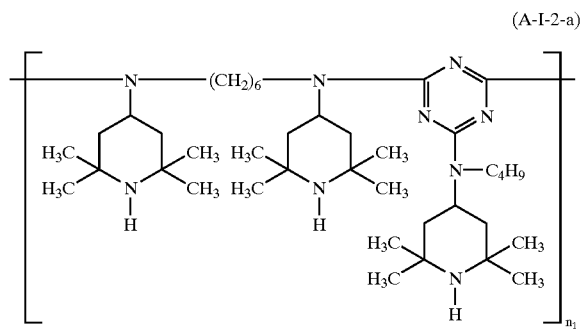

wherein $n_1$ is a number from 2 to 20;

and
component (B) corresponds to the compound of the formula (B-I-2-a);

4. A stabilizer mixture according to claim 1 which additionally contains as a further component
 (X-1) a pigment or
 (X-2) an UV absorber or
 (X-3) a pigment and an UV absorber.

5. A composition according to claim 1, which additionally contains as a further component
 (XX) an organic salt of Ca, an inorganic salt of Ca, Ca oxide or Ca hydroxide.

6. A composition according to claim 1, which additionally contains as a further component
 (XXX) at least an organic salt of Zn, an inorganic salt of Zn, Zn oxide, Zn hydroxide, an organic salt of Mg, an inorganic salt of Mg, Mg oxide or Mg hydroxide.

7. A method for stabilizing polypropylene prepared by polymerization over a metallocene catalyst or a polypropylene copolymer prepared by polymerization over a metallocene catalyst, which comprises incorporating into the polypropylene or polypropylene copolymer a stabilizer mixture as defined in claim 1.

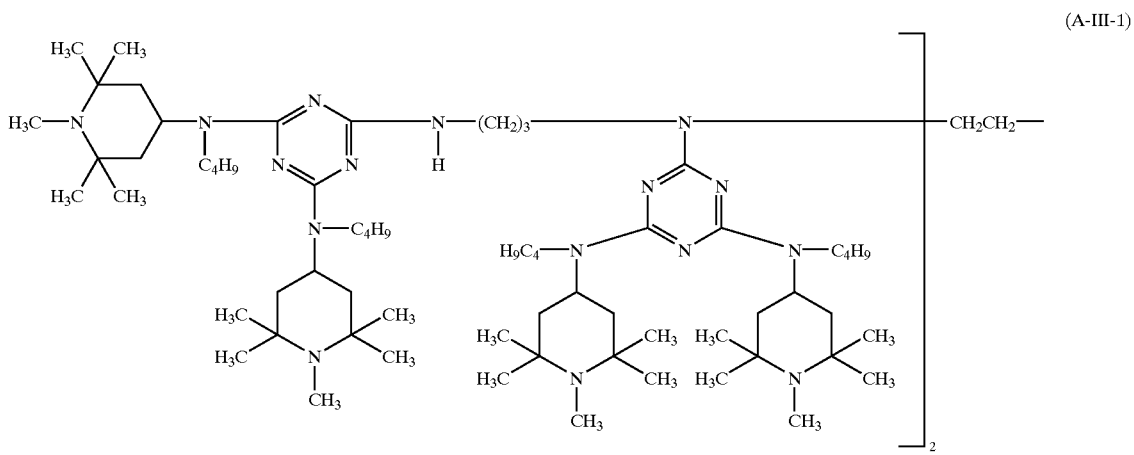

8. A method for stabilizing polypropylene prepared by polymerization over a metallocene catalyst or a polypropylene copolymer prepared by polymerization over a metallocene catalyst, which comprises incorporating into the polypropylene or polypropylene copolymer a stabilizer mixture as defined in claim 2.

* * * * *